United States Patent [19]

Onizuka et al.

[11] Patent Number: 5,586,225
[45] Date of Patent: Dec. 17, 1996

[54] OUTPUT APPARATUS AND METHOD FOR OUTPUTTING A CHARACTER USING A RUN-LENGTH COMPRESSED FONT

[75] Inventors: Yasuki Onizuka, Yokohama; Masashi Kamada, Kawasaki, both of Japan

[73] Assignee: Canon Kabushiki Kaisha, Tokyo, Japan

[21] Appl. No.: 226,844

[22] Filed: Apr. 13, 1994

[30] Foreign Application Priority Data

Apr. 15, 1993 [JP] Japan .................................. 5-088369
Nov. 16, 1993 [JP] Japan .................................. 5-287079

[51] Int. Cl.⁶ .................................................. G06K 15/00
[52] U.S. Cl. .......................................... 395/102; 395/110
[58] Field of Search ................................ 395/114, 102, 395/110, 115, 101; 400/121

[56] References Cited

U.S. PATENT DOCUMENTS

| | | | |
|---|---|---|---|
| 5,062,724 | 11/1991 | Iizuka | 395/102 |
| 5,093,903 | 3/1992 | Sudoh et al. | 395/102 |
| 5,121,468 | 6/1992 | Daino | 395/114 |
| 5,207,517 | 5/1993 | Ito | 395/110 |
| 5,208,676 | 5/1993 | Inui | 395/114 |
| 5,272,768 | 12/1993 | Bauman et al. | 395/110 |

FOREIGN PATENT DOCUMENTS

| | | | |
|---|---|---|---|
| 0448725 | 2/1991 | European Pat. Off. | B41J 2/485 |
| 0434005 | 6/1991 | European Pat. Off. | H04N 1/41 |
| 0478304 | 1/1992 | European Pat. Off. | G09G 1/16 |
| 471482 | 2/1992 | European Pat. Off. | G06K 15/02 |
| 0533049 | 3/1993 | European Pat. Off. | G06K 15/00 |
| 0602818 | 6/1994 | European Pat. Off. | G06K 15/02 |
| 62-018169 | 6/1987 | Japan | G06K 15/02 |
| 2167585 | 5/1986 | United Kingdom | H03M 7/30 |
| 2201273 | 8/1988 | United Kingdom | G06K 15/00 |

OTHER PUBLICATIONS

Patent Abstracts of Japan, vol. 11, No. 190 (E-517), Jun. 1987.

*Primary Examiner*—Raymond J. Bayerl
*Assistant Examiner*—Steven P. Sax
*Attorney, Agent, or Firm*—Fitzpatrick, Cella, Harper & Scinto

[57] ABSTRACT

Data is converted by a prediction function. The converted data is run length compressed and the resultant compressed font data is stored into an ROM. When outputting, the compressive data is sent to a run length expander. The run length expander produces bits of fonts and sequentially stores the produced bits in a RAM. The stored data is sent to a reverse prediction function processor and a font pattern is formed.

18 Claims, 19 Drawing Sheets

FIG. 4

| OPERAND LENGTH | OPERAND DATA SECTION (LSB→ →MSB) | DATA LENGTH | DATA RANGE | DATA INITIAL VALUE |
|---|---|---|---|---|
| 0 |  |  |  | 1 |
| 1 | 1*** | 3 | 1-8 | 1 |
| 2 | 01*** | 3 | 9-16 | 9 |
| 3 | 001*** | 4 | 17-32 | 17 |
| 4 | 0001*** | 4 | 33-48 | 33 |
| 5 | 00001*** | 4 | 49-64 | 49 |
| 6 | 000001**** | 5 | 65-96 | 65 |
| 7 | 0000001**** | 5 | 97-128 | 97 |
| 8 | 00000001**** | 5 | 129-160 | 129 |
| 9 | 000000001***** | 6 | 161-224 | 161 |
| 10 | 0000000001***** | 6 | 225-288 | 225 |
| 11 | 00000000001***** | 6 | 289-352 | 289 |
| 12 | 000000000001****** | 7 | 353-480 | 353 |
| 13 | 0000000000001****** | 7 | 481-608 | 481 |
| 14 | 00000000000001****** | 7 | 609-736 | 609 |
| 15 | 000000000000001******* | 8 | 737-992 | 737 |
| 16 | 0000000000000001******* | 8 | 993-1248 | 993 |
| 17 | 00000000000000001******* | 8 | 1249-1504 | 1249 |
| 18 | 000000000000000001******* | 8 | 1505-1760 | 1505 |
| 19 | 0000000000000000001******* | 8 | 1761-2016 | 1761 |
| 20 | 00000000000000000001******** | 8 | 2017-2272 | 2017 |
| 21 | 000000000000000000001******** | 9 | 2273-2528 | 2273 |
| 22 | 0000000000000000000001******** | 9 | 2529-3040 | 2529 |
|  | 00000000000000000000001********* | 9 | 3041-3551 | 3041 |

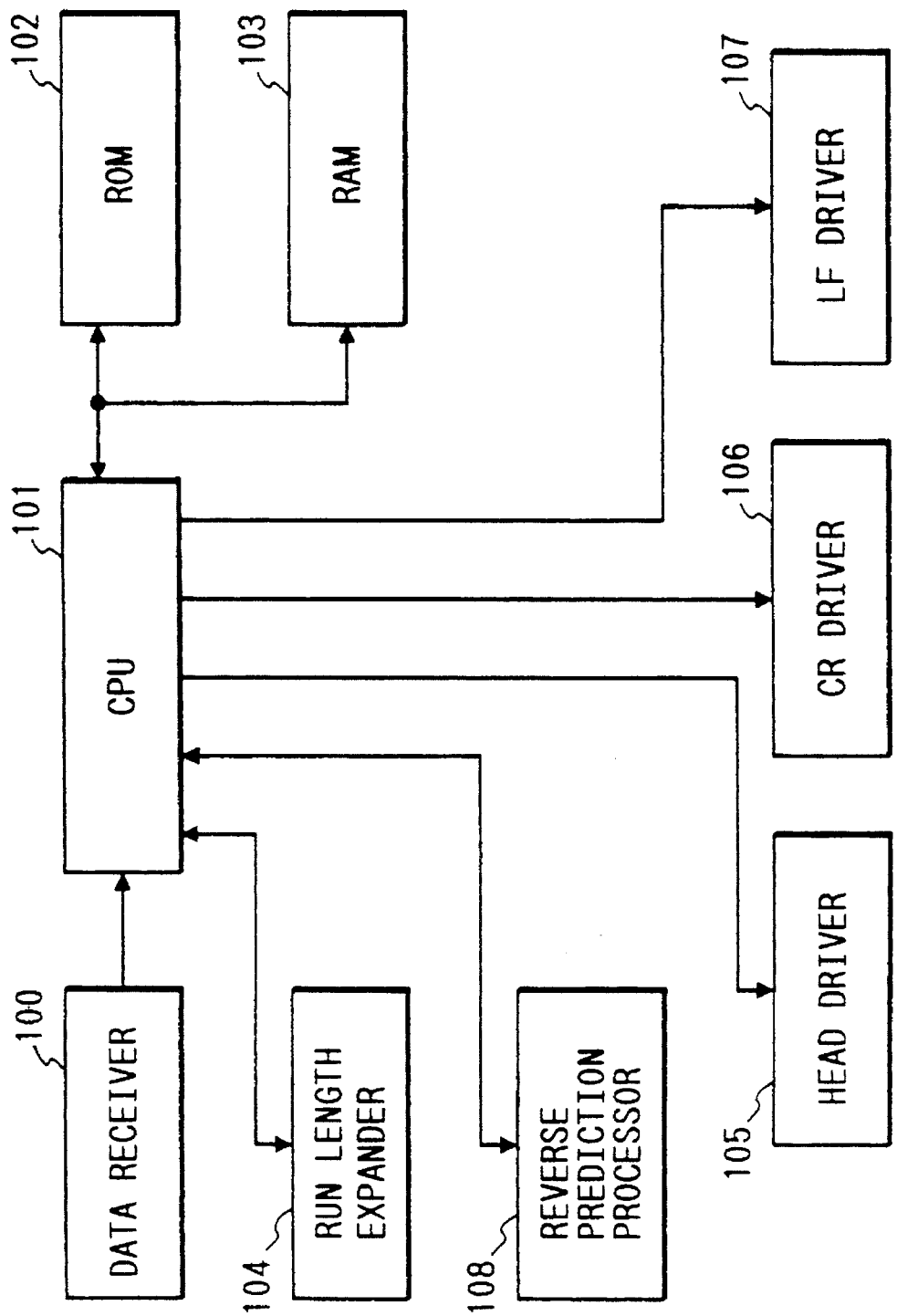

|     | a | b | c | PREDICTED VALUE |
|-----|---|---|---|-----------------|
| (1) | 0 | 0 | 0 | 0 |
| (2) | 0 | 0 | 1 | 1 |
| (3) | 0 | 1 | 0 | 1 |
| (4) | 1 | 0 | 0 | 0 |
| (5) | 0 | 1 | 1 | 1 |
| (6) | 1 | 0 | 1 | 0 |
| (7) | 1 | 1 | 0 | 0 |
| (8) | 1 | 1 | 1 | 1 |

| a | b |
|---|---|
| c | d |

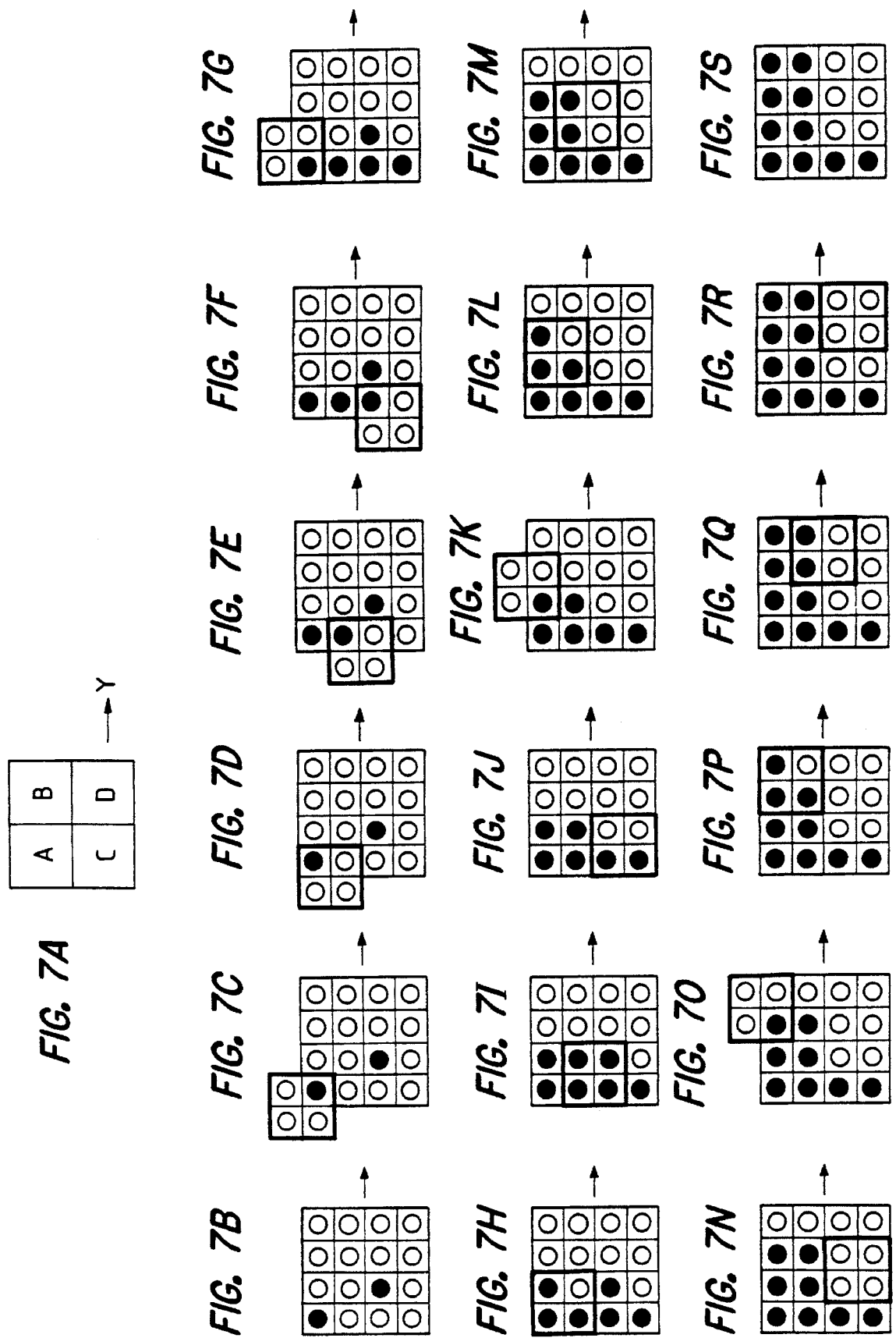

OUTPUT APPARATUS AND METHOD FOR OUTPUTTING A CHARACTER USING A RUN-LENGTH COMPRESSED FONT

BACKGROUND OF THE INVENTION

1. Field of the Invention

The invention relates to an output apparatus and method for outputting a character using a run-length compressed font.

2. Related Background Art (1) Hitherto, in a recording apparatus, image data such as font data or the like is stored into a recording section (ROM) in the recording apparatus and a character bit pattern corresponding to input data is accessed by the recording section developed as print data and printed. In recent years, as for the image data such as font data or the like, print data of a higher resolution is required in order to raise character quality. That is, the number of dots for constructing one character of the font data increases in proportion to the resolution. The font which is formed by a matrix of (48 dots×48 dots) needs 288 bytes (2306 bits) per font. In case of Japanese fonts, now assuming that about 7000 characters exist in one type style, the ROM of the memory section needs about two mbytes. Hitherto, a method of compressing image data and storing the compressed image data into the recording apparatus is used to reduce the ROM capacity. For example, there is run length compression.

(2) Hitherto, in the recording apparatus, in case of printing with a width wider in the printing using paper having a smaller predetermined width, or in case of printing a continuous sheet in accordance with the size of cut paper, such a printing is realized by a form reduction. Specifically speaking, in the case where the image data corresponding to two pages of the continuous sheet having the size of 15 inches×11 inches is printed on A4 size paper which is long in the vertical direction, the form is reduced into ½ of its original length. In the case where the image data corresponding to one page of the continuous sheet of the size of 15 inches×11 inches is printed on A4 size paper which is long in the lateral direction, the form is reduced into ⅔ of its original length. In the case where the image data corresponding to one page of B size paper which is long in the lateral direction is printed onto. A4 size paper which is long in the lateral direction, the form is reduced into ⅘ of its original length. In the case where the image data corresponding to one page of B size paper which is long in the vertical direction is printed onto A4 size paper which is long in the vertical direction, the form is reduced into ⅞ of its original length. In this manner, even in case of the recording apparatus which is designed so as to print on a cut sheet of the A4 size, the recorder can cope with the paper of a width wider than the A4 size.

The above conventional apparatus (1) has the following drawbacks.

1. When a character font is not compressed but is stored as it is into the recording apparatus, the ROM capacity of the recording section is extremely large, resulting in an remarkable increase in cost.
2. In case of data compressing a character font by using the compressing method by the run length, a compression efficiency cannot be fairly raised.
3. In case of compressing a character font and storing into the memory section of the recording apparatus, since logic to expand the compressive data is complicated and the processes must be executed on a bit unit basis, the load on software of the expanding process is fairly large and adversely influences throughout of the whole recording apparatus, resulting in a reduction in printing speed.

The above conventional apparatus (2) has the following drawbacks.

1. In case of developing a character font and reducing a form after the image data of one line has been developed, the reduction in the vertical direction must be executed on a bit unit basis, load on the software of the reducing process is very large and an adversely influences throughout of the whole recording apparatus, resulting in a decrease in printing speed.
2. A software needs to be individually designed in dependence on a difference of reduction ratio, so that a time which is required to design remarkably increases.

SUMMARY OF THE INVENTION

It is, therefore, an object of the present invention to provide a recording apparatus in which when image data is compressed and stored into the recording apparatus, in case of using the run length compression as such a compressing method, a prediction function process is executed original font data, the data is converted so that white dots continue as long as possible so that a compression ratio by the run length compression is raised, ROM capacity of a recording section is substantially reduced, and further a decoding process of the image data is realized by hardware, thereby raising processing speed of formation of font data and printing without reducing a throughput.

Another object of the invention is to provide a recording apparatus in which image data is compressed and stored into the recording apparatus, a run length compression is used as a compressing method, so that an expansion of data is realized by hardware, and image data is formed and recorded.

Still another object of the invention is to provide a recording apparatus in which a reduction in the vertical direction is performed by a simple hardware and form reduction data is formed and recorded.

Further another object of the invention is to provide a recording apparatus in which by improving a hardware for a run length expanding process, a print font can be formed at a high speed, and a higher printing speed is obtained.

To accomplish the above object, according to the invention, there is provided a recording apparatus for developing character data from the outside into an internal font and recording as image data, wherein the apparatus comprises: memory means for storing the data; means for converting the character data from the outside into the internal font data; means for converting the data by a prediction function when the font data obtained by the above conversion is compressed and stored into the memory means; and means for run length expanding the compressed data stored in the memory means and for subsequently executing a reverse prediction function process and converting into desired image data.

Further, according to the invention, there is provided a recording apparatus for developing character data from the outside into internal font and printing as image data, wherein the apparatus comprises: memory means for storing the data; means for converting the character data from the outside into the internal font data; means for compressing the font data obtained by such a conversion and storing into the memory means; and means for run-length expanding the compressed data stored in the memory means, thereby converting into desired image data.

Further, according to the invention, there is provided a recording apparatus for receiving print data from the outside and printing, wherein the apparatus has means for executing a bit operation to reduce in the vertical direction the print data when executing a format reduction printing, thereby converting the print data into desired image data.

Further, according to the invention, there is provided a recording apparatus for executing a run length compressing process and a run length expanding process when a character code which is sent from an external apparatus such as a host computer or the like is converted into a print font, wherein the apparatus has a white word counter for obtaining the number of words of only white dots from the number of white dots decided in the run length expanding process.

BRIEF DESCRIPTION OF THE DRAWINGS

FIG. 4 is a diagram showing a run length code table according to a run length compressing method in the embodiment;

FIG. 5 is an electric block diagram of a recording apparatus according to another embodiment of the invention;

FIG 7A–7S are diagrams showing reconstructing situations of data according to a reverse prediction function process in the embodiment;

FIG. 19 is a diagram showing an example of a compression font; and

DETAILED DESCRIPTION OF THE PREFERRED EMBODIMENTS

Figure 1:
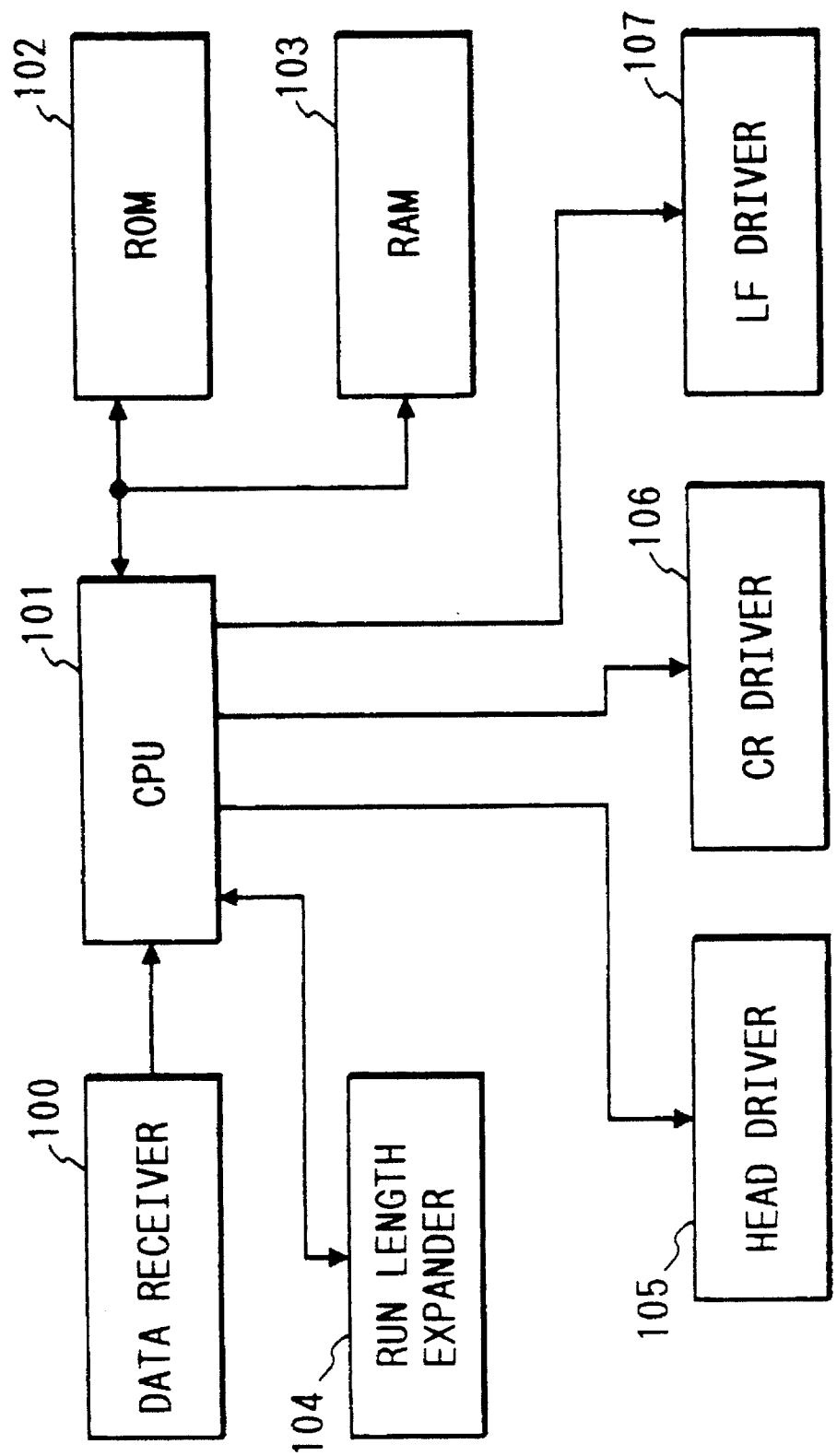
FIG. 1 is an electric block diagram of a recording apparatus regarding one embodiment of the present invention.

Embodiments of the present invention will be described in detail hereinbelow with reference to the drawings.

[Embodiment 1]

In case of specified data such as font data, it can be said that all of the data have regularity when considering a broad visual field. When attention is paid to one font, in case of a two-way code, $2^{n+1}$ states exist as the number of combinations of the past (n) pixels for one pixel (dot). However, it is actually impossible to provide such a logic to all of the states. Therefore, attention is paid to only the pixels around one pixel. Particularly, in case of the font data, as compared with the general image data, the number of change points from the black dot to the white dot and from the white dot to the black dot is small. Therefore, there is considered a method whereby by expressing the change point by the black dot, an amount of white data section is increased and an efficiency of the run length compression is raised. On the other hand, although transition probabilities from the white dot to the white dot and from the black dot to the black dot are very high, transition probabilities from the white dot to the black dot and from the black dot to the white dot are very low. Therefore, binary states of the pixels adjacent to one pixel can be predicted. By applying the above principle to the original font data, the data is reformed to a form which is advantageous to the run length compression by using the prediction function.

Since a black data group and a white data group certainly alternately appear in binary data such as font data, each group is expressed by a run length code. The fonts are sequentially searched from the head in the vertical direction and the continuous white dots are compressed by using a run length code (FIG. 4). When the search point reaches the lower edge of the font, the head dot of one right column is regarded to be continuous to the lower edge, so that it is one-dimensionally encoded. As for the run length code, the encoding is executed by a combination of "0" of continuous 0 to 22 bits (referred to as an operand) prior to "1" and a subsequent specific bit train (referred to as data) (which is decided by a length of operand). That is, now assuming that the number of continuous bits of "0" (=operand section) prior to "1" is equal to (n), the numerical value obtained from a predetermined data length table is set to a bit length of the subsequent "data section". The value which is obtained by adding an entry of a "data initial value table" corresponding to (n) to the value (referred to as "α") of the data section of m bits subsequent to "1" indicates the number of continuous white dots (white block). Although the white block and the black block certainly alternately appear, since whether the head block of the font is the white block or the black block must be judged, it is assumed that a data "identifier" of one bit indicating whether the head block is the white block or the black block is stored into the head of the compressed data. The font data which was run length compressed as mentioned above is stored into the memory section. When developing a print pattern in accordance with input data from the host computer, a run length expanding process is executed by a hardware.

FIG. 1 is an electric block diagram showing a construction of a control system of the recording apparatus according to the embodiment. In FIG. 1, reference numeral 101 denotes a CPU for executing the operation and processes in the recording apparatus; 102 a ROM for storing control programs of the CPU 101, run length compressive data for production of fonts, and various kinds of data for processes; 103 a RAM to temporarily store image data to be printed by a recording head on the basis of the print data which is sent from the host computer and various kinds of data; 100 a data receiver for performing a communication control between the data receiver and an external apparatus such as a host computer or the like and for receiving the print data which is sent from the host computer; 105 a head driver for supplying a control signal from the CPU 101 to a head driver in order to record an image onto a recording medium by the recording apparatus and for transferring the image data to the recording head and for printing; and 106 a CR driver for a carriage motor driver and a carriage motor.

An LF driver 107 of a paper feed motor driver and a paper feed motor is a control system for supplying a control signal to each driver from the CPU 101 and promoting the movements in the horizontal and vertical directions of the recording head which are necessary when the printing is executed to the recording medium. Reference numeral 104 denotes a run length expander for reconstructing the run length compressive fonts stored in the ROM 102 into a print bit pattern. A control procedure in the embodiment will now be similarly described with reference to FIG. 1. First, the data received by the data receiver 100 is temporarily stored in the RAM 103. A command, image data, and a character code are analyzed by the CPU 101 in accordance with the program stored in the ROM 102. In case of the character code, the font data which has previously been run length compressed and stored is read out from the ROM 102 and sent to the run length expander 104. In the run length expander, bits of the font are produced and are sequentially stored into the RAM 103. At a time point when the development of the image data of one line is finished or when a print command is input from a host computer of the external apparatus, the CR driver 106 is driven and the print data is transferred from the RAM 103 to the head driver 105 and is printed. After completion of the printing, the LF driver 107 is driven and the series of sequence is finished.

Figure 2:
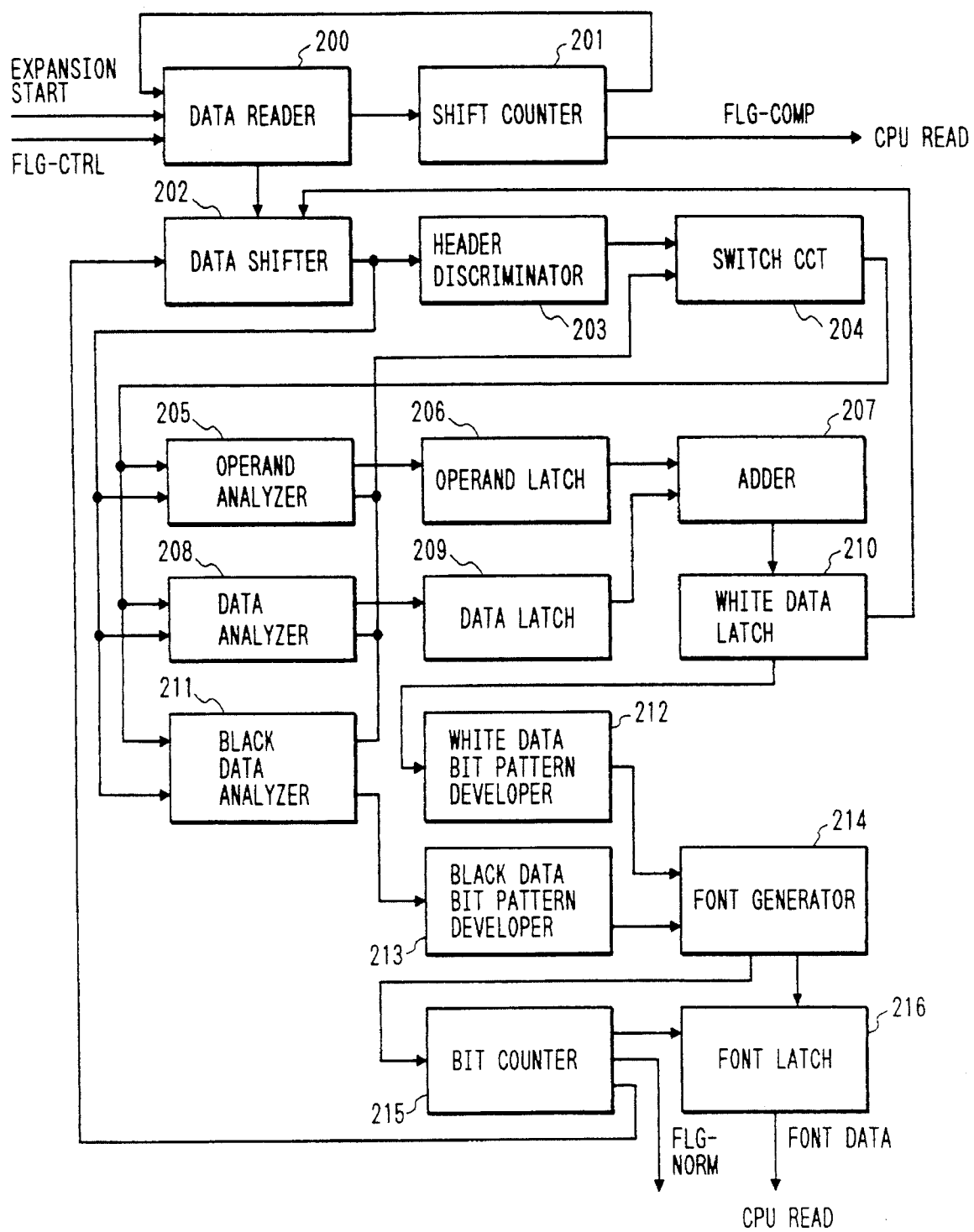
FIG. 2 is a block diagram of a run length expander in the embodiment.

A block diagram of the run length expander 104 in FIG. 2 will now be described in detail. An example, FIG. 2 shows the case where an access unit of the CPU is set to one word (16 bits) and a compressive font which was compressed in the vertical direction is expanded. A request for the run length expansion is generated from the CPU by a control flag FLG-CTRL. Compressive fonts which have previously been formed in accordance with a run length code table in FIG. 7A and FIGS. 7B–7S are transferred by an amount of one word to a data reader 200. When the data transfer is confirmed, the data is sequentially shifted one bit by one bit by a data shifter 202. Reference numeral 201 denotes a shift counter to count the number of shifting times. When it is detected that the shifting process is performed by only the number of bits of the compressive font and that the shifting process is finished, a compressive font one-word end flag FLG-COMP is set. The compressive font one-word end flag is cleared at a time point when the next compressive fonts of one word are transferred. First, the first bit of the first data is sent to a header discriminator 203, by which a check is made to see if the subsequent bit is a white bit or a black bit. Information indicative of the result of the discrimination is sent to a switch circuit 204 of an operand, data, and black data. Reference numeral 205 denotes an operand analyzer of white data for counting the number of bits "0" which were shifted by the data shifter 202 and for obtaining the data initial value corresponding to a length of operand by the count value at the time point when "1" is detected and for transferring the data initial value to a latch circuit 206. The operand analyzer 205 obtains a bit length of the data section which has been set by each operand length and transfers information indicative of the bit length to a data analyzer 208. An end of operand analysis by the operand analyzer 205 is informed to the switch circuit 204. The data analyzer 208 is activated by the switch circuit 204. The data analyzer 208 detects the bits "1" and "0" of the shift data subsequent to the operand and obtains the value shown in a data expressible range in FIG. 7A and FIGS. 7B–7S and transfers to a data latch circuit 209.

The end of data analysis by the data analyzer 208 is subsequently informed to the switch circuit 204. The values latched in the latch circuits 206 and 209 are supplied to an adder 207 and are added. The addition result is sent to a latch circuit 210 as the number of white data bits. The data shifting process of the data shifter 202 is now once interrupted and a font developing process of the white data is started. For example, now assuming that the data of the operand section and data section is set to "000010100" (LSB⇔MSB), the operand section is set to "0001". As will be understood from FIG. 4, the data initial value at this time is equal to "49" and the bit length of the data section is equal to four bits. The processes until now are executed by the operand analyzer 205.

Since the data section is "0100" (LSB⇔MSB), the value is equal to "2". This analysis is executed by the data analyzer 208. After addition, the white data bit length is equal to "51". The white data bit number which was latched in the latch circuit 210 is sequentially developed into a vertical bit train by a white data bit pattern developer 212. A font matrix is formed by a font generator 214. The font which was formed into 16 bits in the vertical direction is transferred to a latch circuit 216 and its information is supplied to the CPU as a control signal (normalization font one-word completion flag FLG-NORM) and the font data is stored into the RAM.

A bit counter 215 counts the number of development bits, judges the end, informs the end to the data shifter 202, allows the shifting process to be restarted, and activates a black data analyzer 211. The black data analyzer 211 detects "1" or "0" of the bits which were shifted from the data shifter 202 and sets the bits of only [(the number of bits "0")+1] to black bits and activates a black data bit pattern developer 213. After that, a font matrix is formed by processes similar to those in the white dot development. For example, in the case where four black dots continue, they are expressed as an operand and the data subsequent to them is expressed as "0001".

The above processes are executed the number of times as many as only the number of bits of the shift data by the shift counter 201. When the completion of the shifting process is detected, the process to read the compressive data from the ROM is again continued. The above processes are repeated until the normalization fonts of one character are formed. A judgment about the end is performed by counting the number of words of the print font by the CPU.

Figure 3:
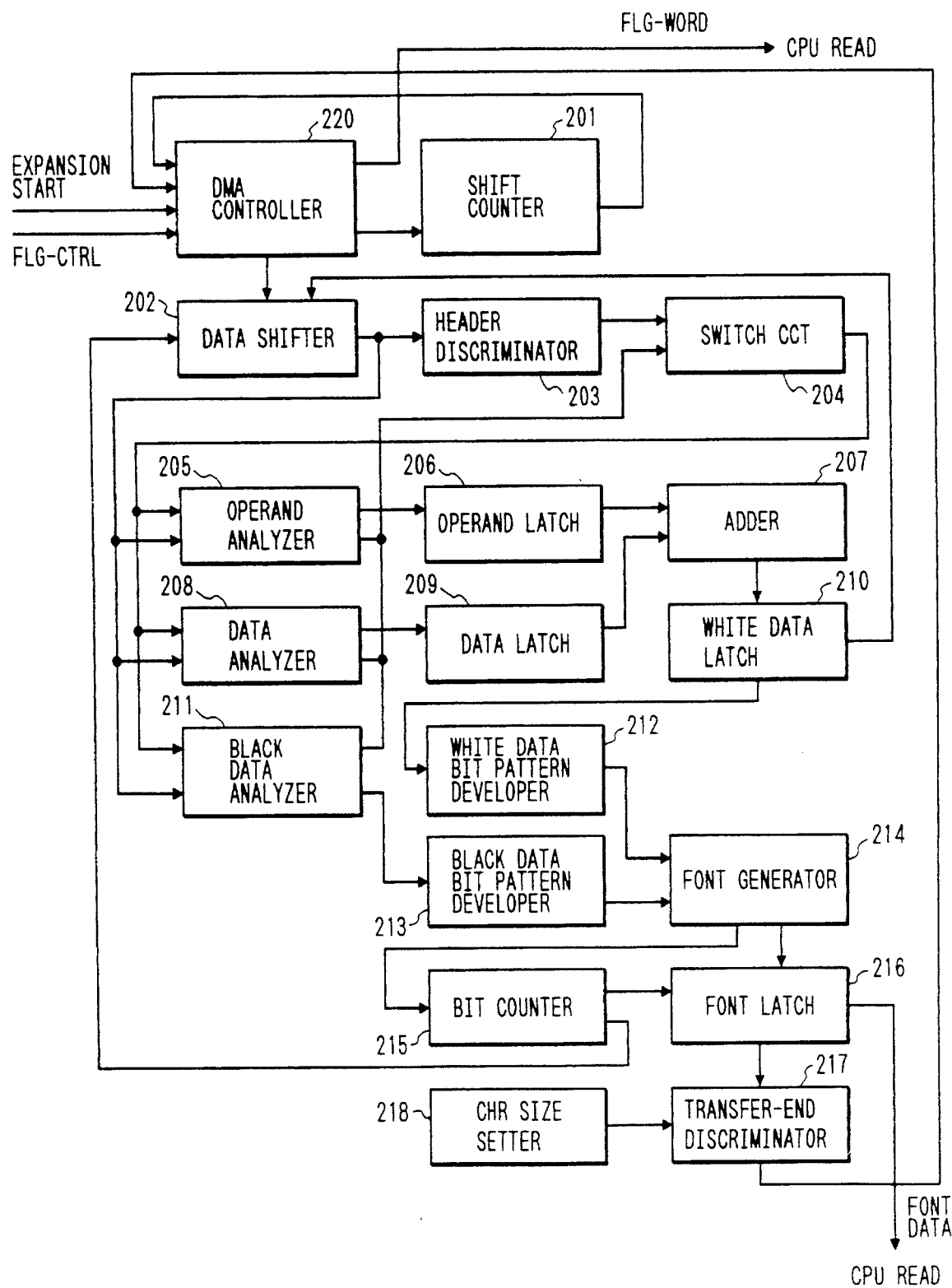
FIG. 3 is a block diagram of another run length expander.

In the embodiment 1, at a time point when the development of 16 bits in the vertical direction is finished, the control signal (normalization font one-word completion flag) is transmitted to the CPU. The CPU reads out the developed bit fonts by the control signal and stores into the RAM. However, in a run length expander as shown in FIG. 3, a DMA controller 220 is provided in place of the data reader 200. After completion of the development of 16 bits in the vertical direction, the bit font is transferred to the RAM (DMA transfer) without transmitting through the CPU. The end of development of one character is judged by a transfer-end discriminator 217 for counting the data of one character, thereby stopping the activation of the DMA control. The stop of the DMA control is confirmed and the end of the development of one character can be informed to the CPU by a flag. In this way processing speed can be further raised. In the case where a plurality of font sizes exit, a character size setter 218 having a switch is provided and a data counter of one character in the transfer-end discriminator 217 is made variable, thereby also making the apparatus effective to fonts of different sizes. Further, in case of registering external characters such as down-load characters or the like from the host computer, by storing the run length compressing process as a program into the internal RAM, an external character registering area can be extremely reduced to a size smaller than the ordinary registering area. Such a construction can also contribute to the reduction of the RAM capacity.

According to the embodiment 1 as described above, an information amount of the font data in the recording apparatus can be decreased and the cost can be reduced. Further, by executing the expanding process of the run length compressed data by hardware, processing speed to make the font data can be raised, the load of the software can be fairly reduced, and the throughput of the whole recording apparatus can be improved. [Embodiment 2]

FIG. 5 is an electric block diagram showing a construction of a control system of a recording apparatus according to an embodiment 2. Reference numerals 100 to 107 denote the same component elements as those shown in FIG. 1 and the embodiment 2 is similar to the embodiment 1 except that a reverse prediction processor 108 exists.

In FIG. 5, reference numeral 101 denotes the CPU for executing the operation and processes in the recording apparatus; 102 the ROM to store the control programs for the CPU 101, run length compressive data to form fonts, and various kinds of data for processes; 103 the RAM to temporarily store the image data and various kinds of data to be printed by a recording head based on the print data which is sent from the host computer; 100 the data receiver for executing a communication control between the data receiver and an external apparatus such as a host computer or the like and for fetching the print data which is sent from the host computer; 105 the head driver to which the control signal is supplied from the CPU 101 in order to record an image onto a recording medium by the recording apparatus and which transfers image data to the recording head and prints; and 106 the CR driver for a carriage motor driver and a carriage motor.

The LF driver 107 of the paper feed motor driver and the paper feed motor is a control system for supplying a control signal from the CPU 101 to each driver and for promoting the movement in the horizontal direction and the movement in the vertical direction of the recording head which are necessary when printing onto a recording medium. Reference numeral 104 denotes the run length expander for reconstructing a print bit pattern from the run length compressive font stored in the ROM 102. Reference numeral 108 denotes the reverse prediction processor for reconstructing the original font from the data which was expanded by the run length expander 104.

A control procedure in the embodiment will now be described with reference to FIG. 5 in a manner similar to that mentioned above. First, the data which was received by the data receiver 100 is once stored into the RAM 103 and a command, image data, and a character code are analyzed by the CPU 101 in accordance with the program stored in the ROM 102. In case of the character code, the font data which has previously been data converted by the prediction function as mentioned above and has been run length compressed and stored is read out from the ROM 102 and is sent to the run length expander 104. The bits of the font are produced by the run length expander and are sequentially stored into the RAM 103. The stored data is sent to the reverse prediction processor 108 and a print font pattern is formed. At a time point when the development of the image data of one line is finished or when a print command is input from the host computer as an external apparatus, the CR driver 106 is driven. The print data is transferred from the RAM 103 to the head driver 105 and is printed. After completion of the printing, the LF driver 107 is driven and a series of operation sequence is finished.

Explanation will now be made in accordance with a prediction function value table in FIG. 6A.

Figures 6A, 6B, 6C:
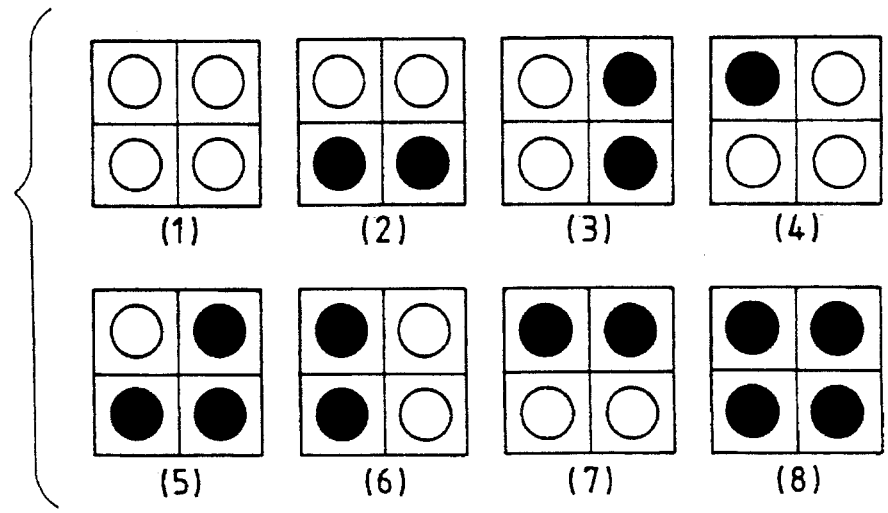
FIGS. 6A–6C are diagrams showing combination situations of data and a prediction function value table according to the embodiment.

In case of paying an attention to the dots located at the upper position (b), left position (c), and oblique position (a) of one dot (d) existing in a font shown in FIG. 6B, a dot in which a probability at which the dot appears as (d) is high for a combination of the three dots (a, b, c) is called a prediction function. The value of the prediction function for the dots (a to c) is compared with the value of the actual bit (d). When they coincide, the value of (d) is replaced to "0" (white). When they differ, (d) is replaced to "1" (black). Namely, a pattern of a high transition probability is replaced by white. Due to this, the dots in most of the portions are replaced by white and a compression efficiency of the run length compression is raised.

Matrices shown in FIG. 6C are expressed by the following prediction function equation.

$$\text{Func}(A, B, C) = (\bar{A} \text{ \& } B) \text{ or } (\bar{A} \text{ \& } C) \text{ or } (B \text{ \& } C) \quad \text{equation (1)}$$

As mentioned above, the original font data is converted by the prediction function, the converted data is run length compressed, and the compressive data is stored into the memory of the recording apparatus. When the character data which is sent from the external apparatus such as a host computer or the like is developed into a character font, the run length expansion is first executed from the compressive data stored in the memory and a logic circuit of the reverse prediction function process is assembled for the data which was run length expanded.

The logical equation of a reverse prediction function of the reconstructing process is as follows (refer to FIG. 7A).

$$Y = D \text{xor}(\bar{A}*B + \bar{A}*C + B*C) \quad \text{equation (2)}$$

Y=output data

D=unprocessed data

FIGS. 7B–7S show examples of the reconstructing process.

FIG. 7A relates to the data which was formed by performing the prediction function process to the original font data. The data is sequentially reconstructed in accordance with the equation (2) from the dot existing at the left upper edge of the above data. In FIGS. 7C–7R, one dot on the outer periphery at the left and upper edges is virtually regarded as white (0). Among the four dots surrounded by a bold frame, three dots locating at the upper position "B", left position "C", and oblique position "A" of the relevant dot "D" are taken out. The value of the dot "D" is checked. If D="0", this means that the value of D coincides with the prediction function value. If D="1", this means that the value of D differs from the prediction function value.

When considering in the matrix of FIG. 7C, with respect to four dots surrounded by a bold frame, the dot corresponding to "D" is set to black "1" and differs from the prediction function value. Therefore, from the prediction function value table of FIG. 2, it will be understood that the dot is set to black "1". The process in FIG. 7D will now be executed. In this instance, the dot produced in FIG. 7C is used as a dot existing at the right upper position. In a manner similar to FIG. 7C, when attention is paid to the dot "D", it is equal to white "0" and coincides with the prediction function value. In this case, it will be understood from the prediction function value table of FIG. 2 that the matrix of FIG. 7D corresponds to the pattern of "3" and the dot is equal to black "1". By sequentially repeating the above processes, a pattern of FIG. 7S is reconstructed. A logic which satisfies the above logic equation is constructed every bit by the hardware and a desired character font data formation is realized.

Figure 8:
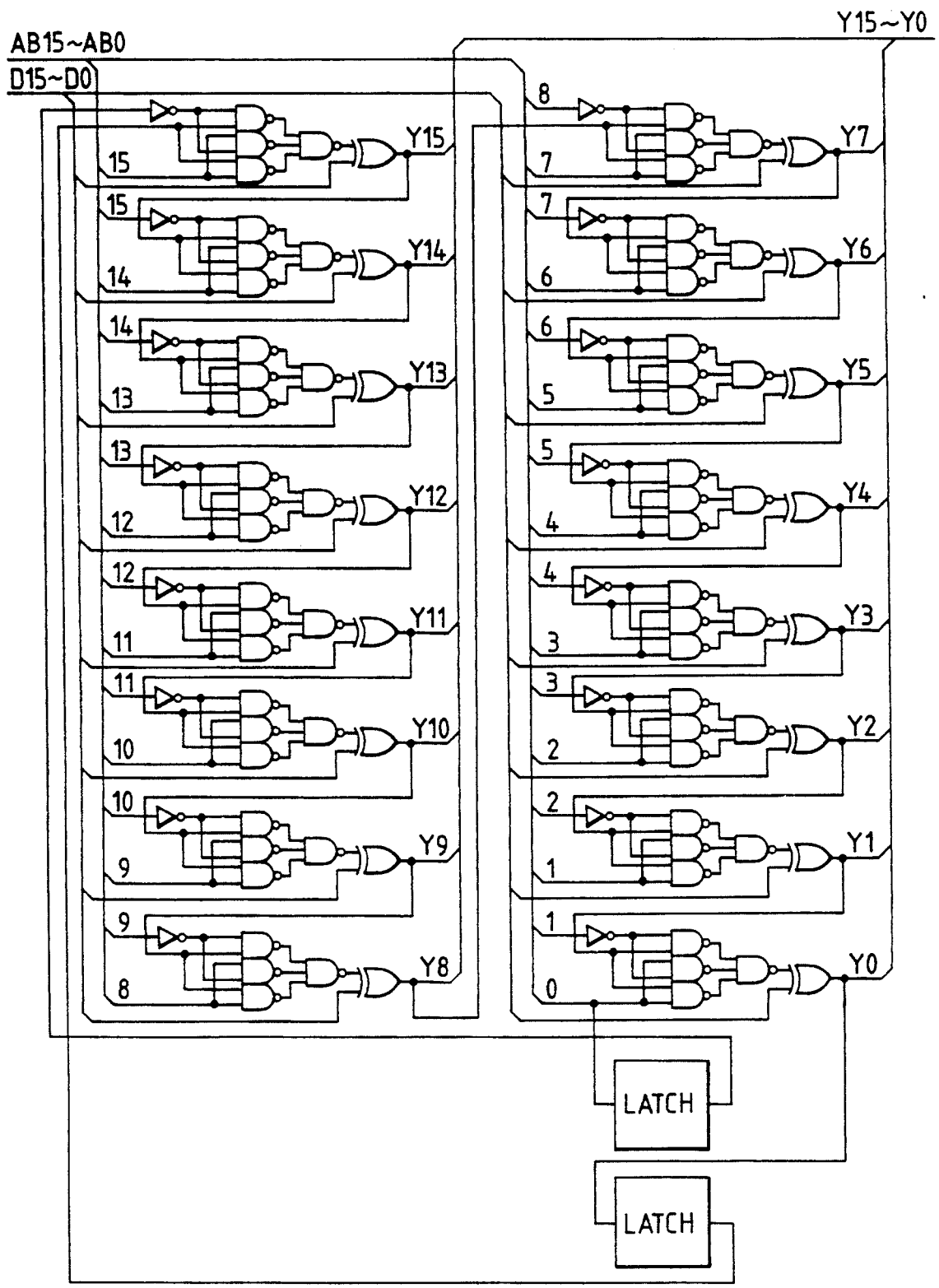
FIG. 8 is a diagram showing a construction of a reverse prediction processor of the embodiment.

FIG. 8 is a diagram showing a hardware construction of the reverse prediction processor 108. In the above logic, the converting operation is executed every 16 bits. The converted data of the previous line is transferred to AB15 to AB0 and the unconverted data is transferred to D15 to D0. The reverse prediction function processing logic operates simultaneously with the completion of the data transfer and the data corresponding to those bits is output to Y15 to Y0. By reading out the outputs Y15 to Y0, the data to which the reverse prediction function process was performed can be obtained. The least significant bit is latched for the process of the most significant bit of the next dot train. After completion of the reading operation, the input section is cleared.

Although the reverse prediction function process has been executed every 16 bits in the above embodiment, by installing logic circuits of the number corresponding to one dot train in the vertical direction of the font size for each bit, there is no need to clear the input section by the software. A processing speed can be raised and the data which was converted without transmitting through the CPU can also be transferred to the RAM. In case of registering an external character such as a down-load character or the like from the host computer, by storing the run length compressing process and the prediction function process as programs of the internal ROM, the external character registration area can be remarkably reduced to an area smaller than the ordinary registration area. The invention can also contribute to the decrease in RAM capacity.

According to the embodiment 2 as described above, by converting the original font data by using the prediction function, most of the portions of the black dots can be replaced to the white dots, and the compression efficiency of the run length compression can be extremely raised. By executing the reverse prediction function process by the hardware, the load of the CPU (software) can be reduced, the processing speed of the font data formation can be raised, and the throughput of the whole recording apparatus can be improved.

[Embodiment 3]

Figure 11D:
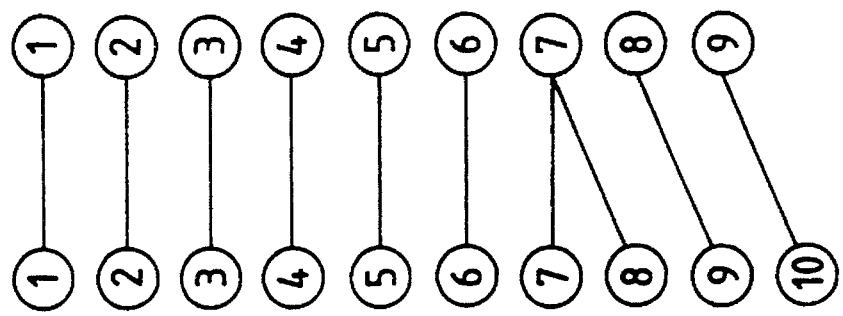
FIGS. 11A–11D are diagrams for explaining reduction bit converting methods.
Figure 11C:
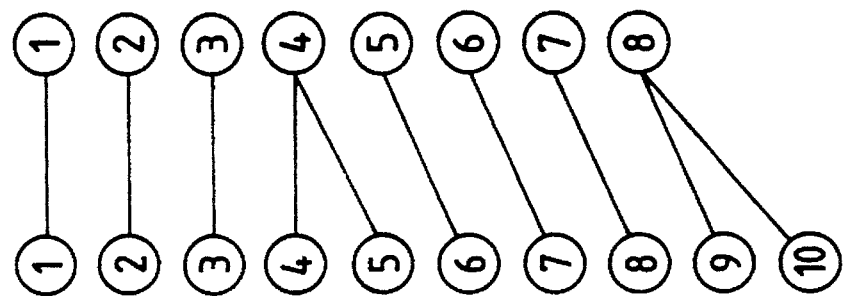
Figure 11B:
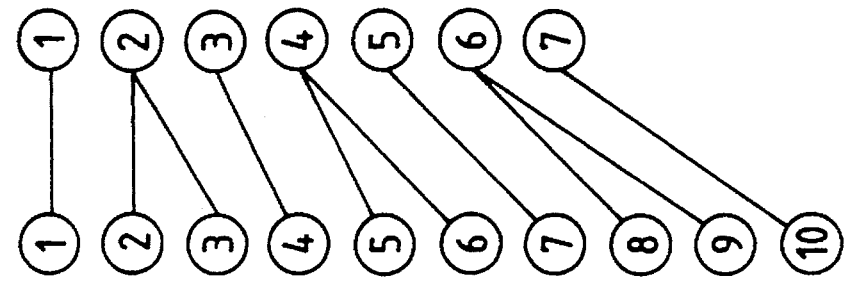
Figure 11A:
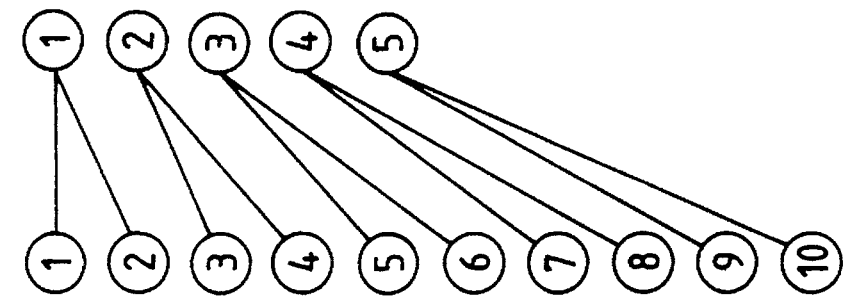

In case of reducing data in the vertical direction, the dots at predetermined positions in the data before reduction are thinned out by each reduction ratio (FIGS. 11A–11D). In FIG. 11A, the data is thinned out every other dot by the ½ reduction ratio. In FIG. 11B, the data is thinned out at a ⅔ reduction ratio of one dot per three dots. In FIG. 11C, the data is thinned out at a ⅘ reduction ratio of one dot per five dots. In FIG. 11D, the data is thinned out at a ⅞ reduction ratio of one dot per eight dots. A logic is constructed so that the data can be converted as shown in FIGS. 11A to 11D, thereby realizing a high processing speed.

Figure 9:
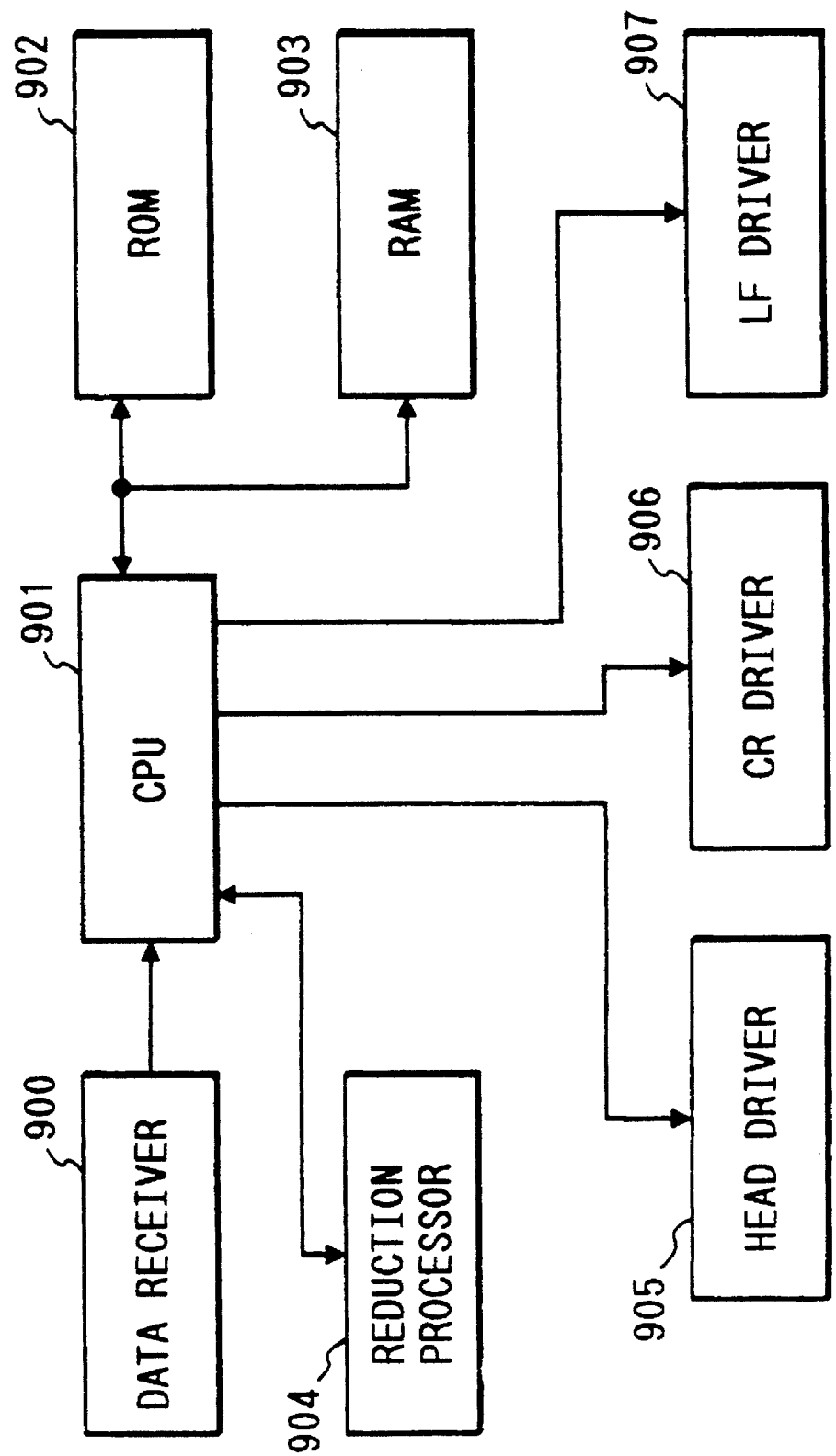
FIG. 9 is an electric block diagram of a recording apparatus according to still another embodiment of the invention.

FIG. 9 is an electric block diagram showing a construction of a control system of a recording apparatus according to the embodiment. In FIG. 9, reference numeral 901 denotes a CPU for executing the operation and processes in the recording apparatus; 902 an ROM for storing control programs for the CPU 901 and character fonts; 903 an RAM for temporarily storing image data and various kinds of data to be printed by a print head based on the print data which is sent from a host computer; 900 a data receiver for executing a communication control between the data receiver and an external apparatus such as a host computer or the like and for taking the print data which is sent from the host computer; 905 a head driver for supplying a control signal from the CPU 901 to the head driver in order to record an image onto a recording medium by the recording apparatus and for transferring image data to the recording head and printing; and 906 a CR driver of a carriage motor driver and a carriage motor. An LF driver 907 of a paper feed motor driver and a paper feed motor is a control system for supplying a control signal to each driver from the CPU 901 and for promoting a movement in the horizontal direction and a movement in the vertical direction of the recording head which are necessary for printing. Reference numeral 904 denotes a reduction processor for performing a bit conversion in the vertical direction in accordance with a reduction ratio which was set by the CPU 901.

A control procedure in the invention will now be described with reference to FIG. 9 in a manner similar to that mentioned above. First, the data which was received by the data receiver 900 is once stored into the RAM 903 and a command, image data, and a character code are analyzed by the CPU 901 in accordance with the program stored in the ROM 902. In case of the character code, the font data which has previously been stored in the ROM 902 is sequentially read out and a bit pattern is stored into the RAM 903. The stored bit pattern is sent to the reduction processor 904 in accordance with a reduction ratio of the format reduction which was set by the CPU. Each desired bit pattern is formed and is again stored into the RAM 903. At a time point when the development of the image data of one line is finished or when a print command is input from the host computer as an external apparatus, the CR driver 906 is driven and the print data is transferred from the RAM 903 to the head driver 905 and is printed. When the data is transferred to the head driver 905, the data is also simultaneously reduced in the lateral direction. The data reduction in the lateral direction is executed by a method of thinning out the data on a byte unit basis or on a word unit basis. After completion of the printing, the LF driver 907 is driven and a series of operation sequence is finished.

Figure 10:
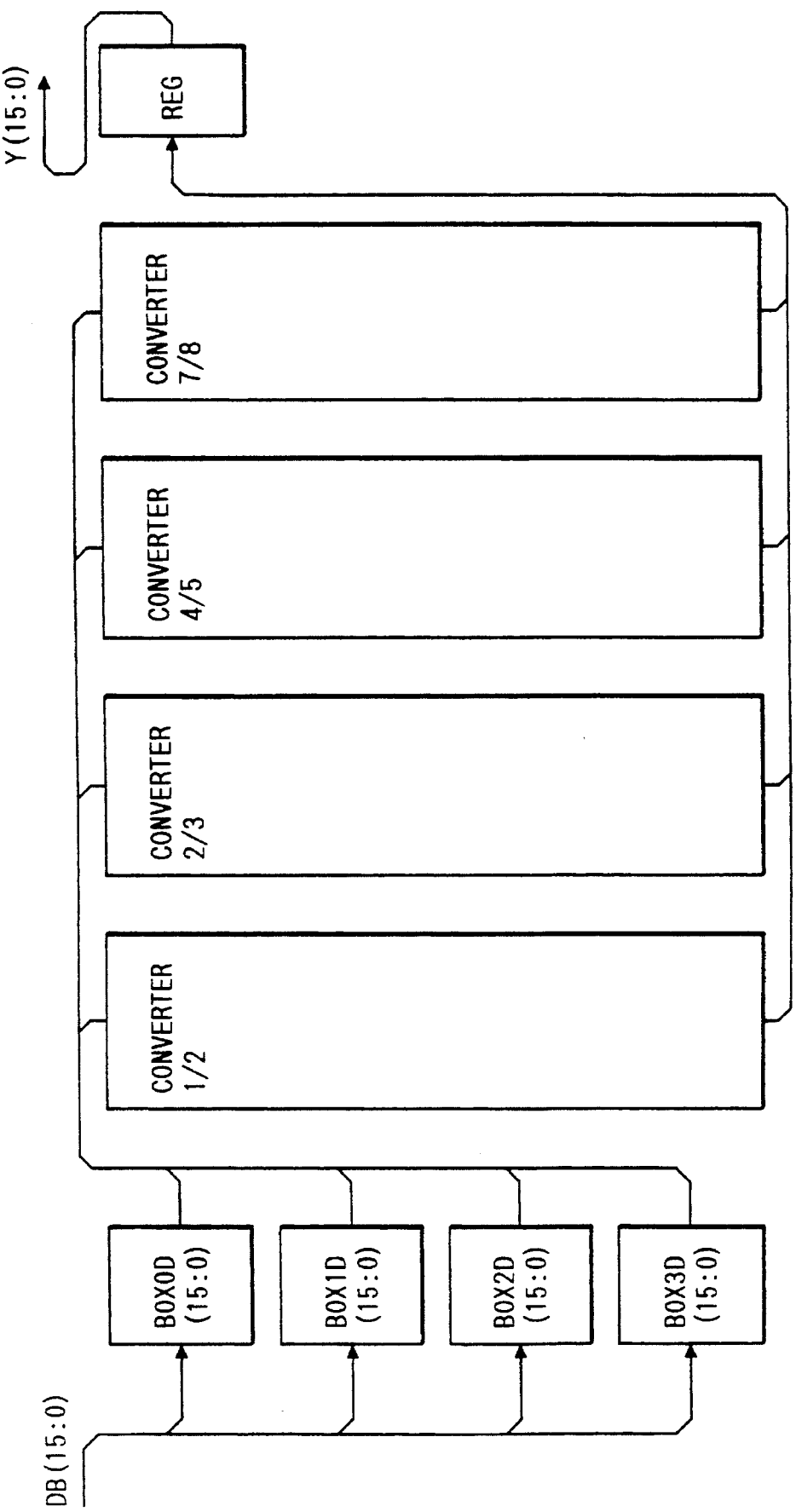
FIG. 10 is a block diagram of a reduction processor in the embodiment.

FIG. 10 shows a hardware construction of the reduction processor 904. In the above logic, the data before conversion of 64 dots in the vertical direction is first written by the CPU four times every word and is respectively transferred to BOX0D (15:0), BOX1D (15:0), BOX2D (15:0), and BOX3D (15:0) and is sent to converters 910 to 913 for executing the data reduction in the vertical direction at reduction ratios of ½, ⅔, ⅘, and ⅞ as shown in FIG. 11, respectively. Outputs of the converters are transferred to a register REG of 16 bits and by reading the outputs Y0 to Y15 from the CPU, the reduced data can be obtained.

Figure 12:
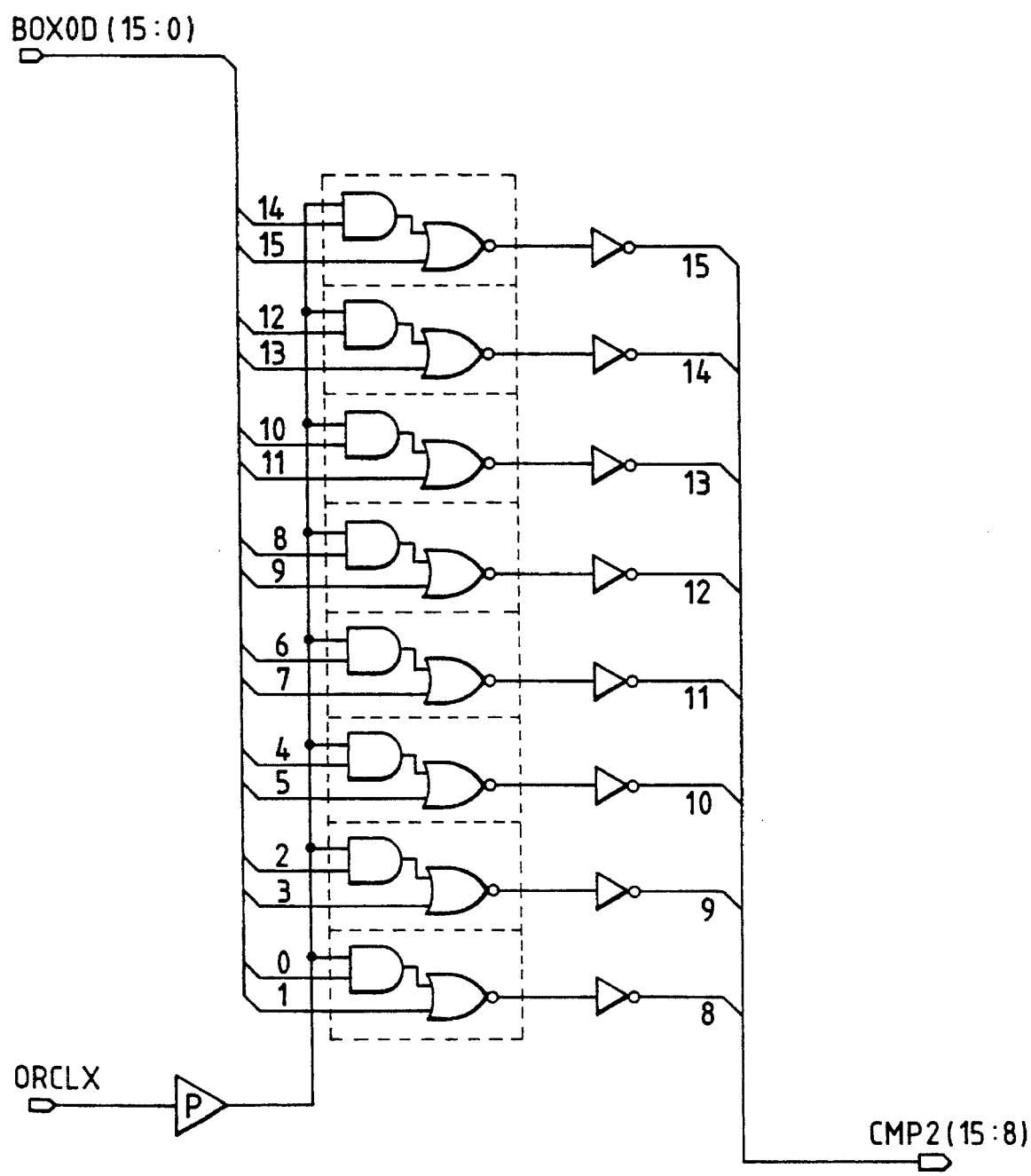
FIG. 12 is a block diagram of a ½ reduction converter.
Figure 13:
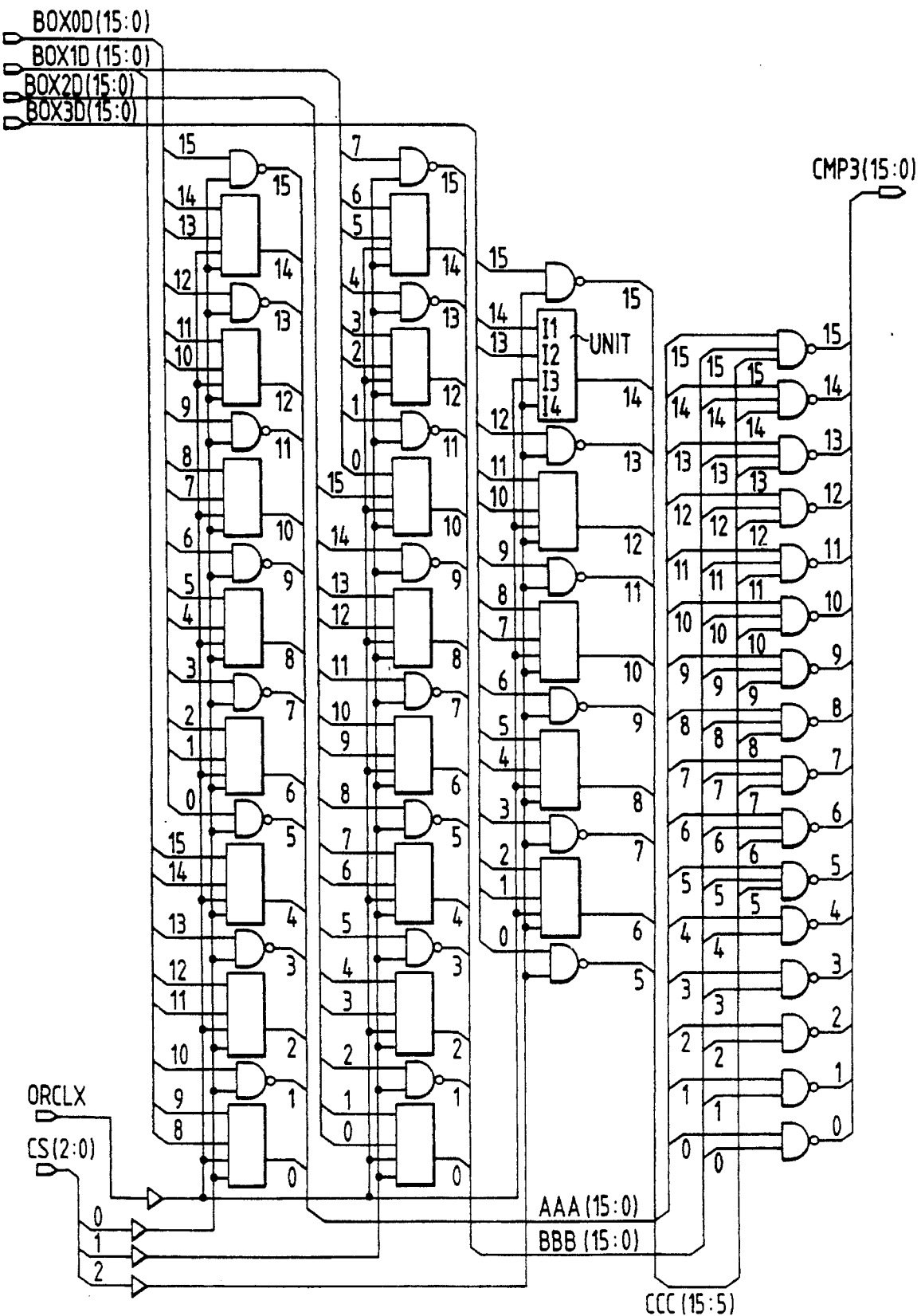
FIG. 13 is a block diagram of a ⅔ reduction converter.
Figure 14:
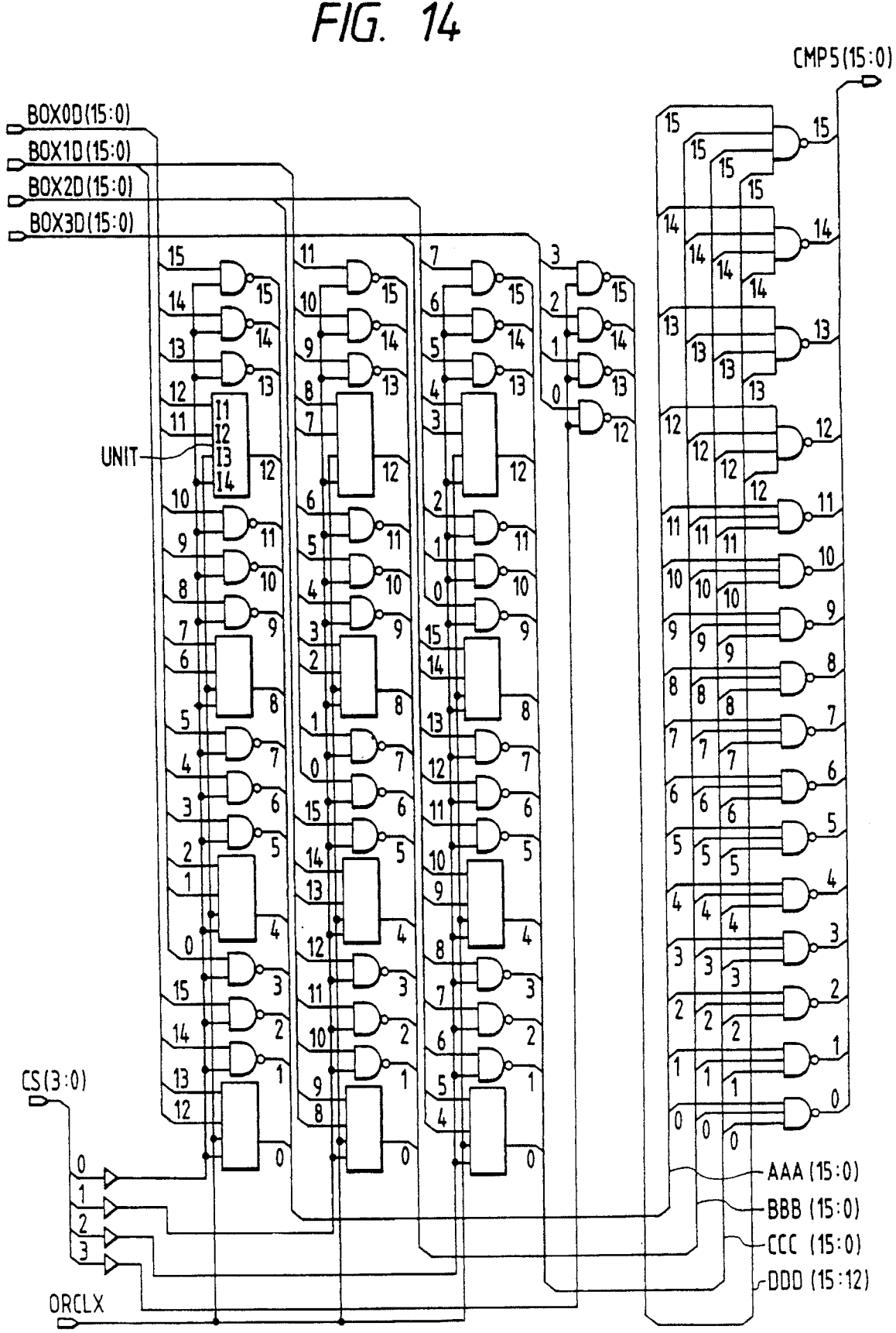
FIG. 14 is a block diagram of a ⅘ reduction converter.
Figure 15:
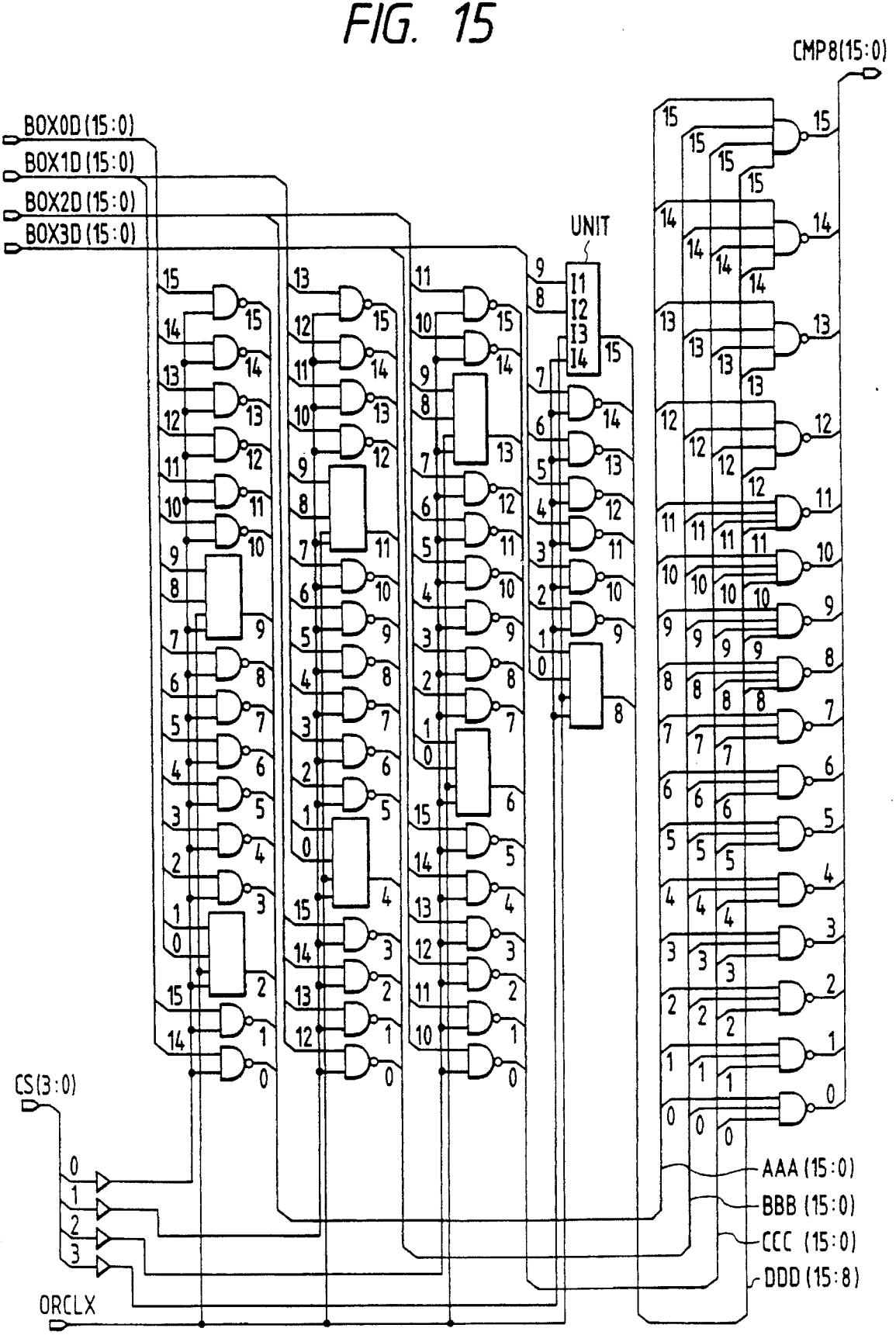
FIG. 15 is a block diagram of a ⅞ reduction converter
Figure 16:
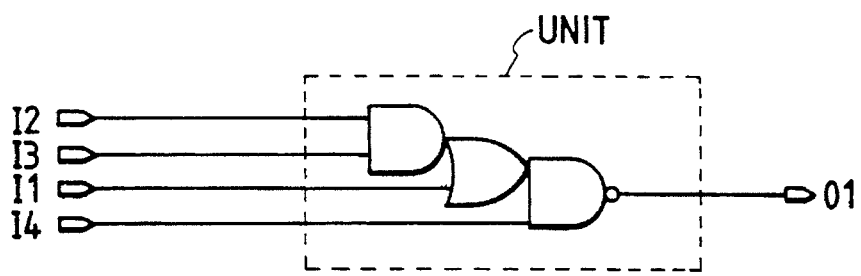
FIG. 16 is a block diagram of UNIT.

FIGS. 12 to 16 show internal circuit constructions of the converters 910 to 913. FIG. 12 shows the converter 910 to execute the ½ data reduction. FIG. 13 shows the converter 911 to perform the ⅔ data reduction. FIG. 14 shows the converter 912 to perform the ⅘ data reduction. FIG. 15 shows the converter 913 to perform the ⅞ data reduction. FIG. 16 shows an internal structure of a UNIT in FIGS. 13 to 15. In the diagrams, ORCLX denotes a switch to select either one of the mode to simply thin out the bits and the mode to get the OR between the dot and the adjacent dot. CS(2:0) denotes an address decoding. When the reduced data is read by the CPU, it is read four times by the value of CS on a word unit basis. CMP2(15,8), CMP3(15,0), CMP5(15,0), and CMP8(15,0) denote data after the conversion.

In the embodiment 3, when reducing, the data is formed by thinning out the dots. However, in the case where the quality of the produced data becomes a problem, by providing a switch to select either one of the mode to get the OR between the data to be thinned out and the adjacent data and the mode to simply thin out and by assembling such a circuit into the apparatus, a reduced bit pattern can be also produced. Script characters (superscript character, subscript character) can be also formed by using such a circuit and processes of the software depending on the character kinds can be reduced.

According to the embodiment 3 as described above, when a format reduction is executed, by realizing the bit conversion of the vertical reduction by a hardware, the load of the software can be reduced, the processing speed of the data formation can be raised, and the throughput of the whole recording apparatus can be improved.

[Embodiment 4]

Figure 17:
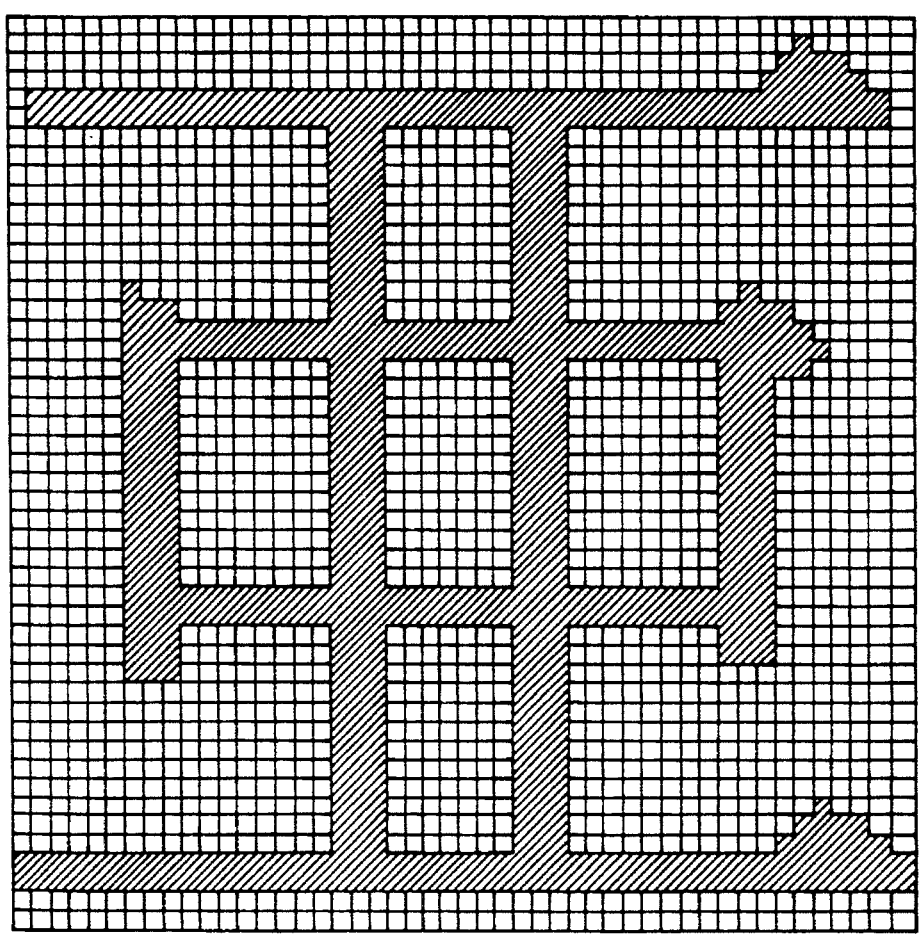
FIG. 17 is a diagram showing an example of a print font of (48×48) dots.
Figure 18:
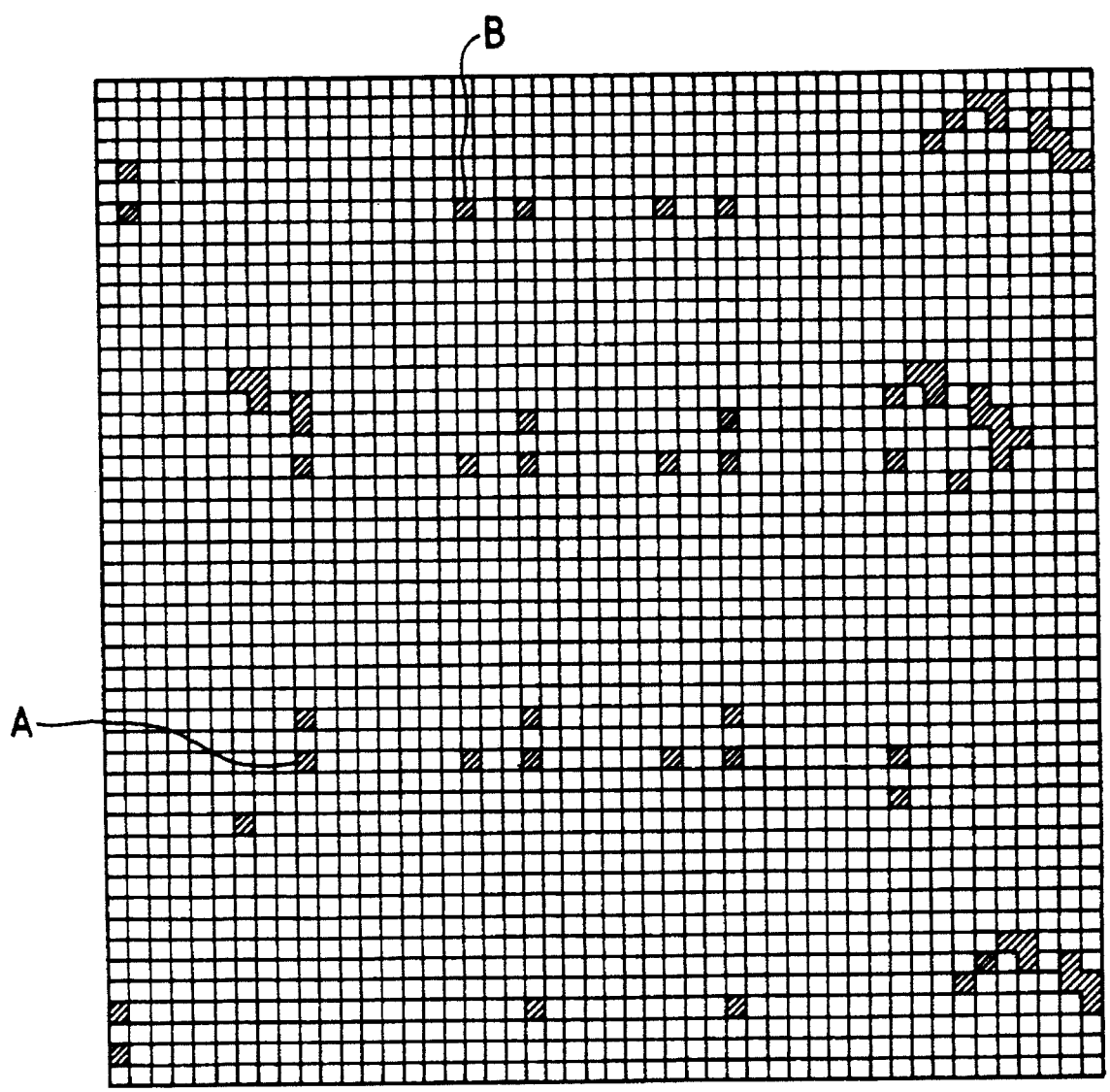
FIG. 18 is a diagram showing an example of a normalization font.
Figure 19:
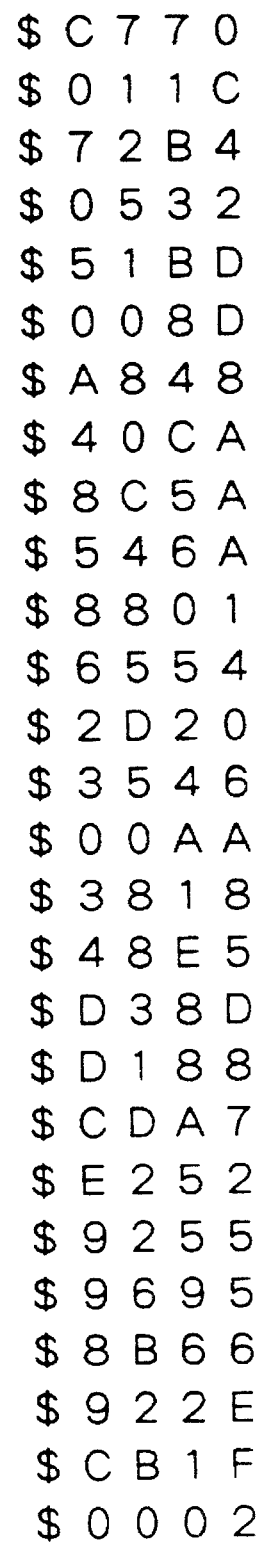

FIG. 17 shows an example ("玉" of a Chinese character, which reads "a") of a print font of (48×48 dots) by the recording apparatus of the embodiment 1. FIG. 18 is a normalization font which is obtained by normalizing the print font of FIG. 17 by a prediction function. A hexadecimal notation in FIG. 19 shows a compressive font which is obtained by run length compressing the normalization font in FIG. 18 and the compressive font is stored in the ROM in such a format. In the recording apparatus, the compressive font in FIG. 10 stored in the ROM is expanded to the normalization font in FIG. 18 by the run length expander and, after that, it is reconstructed to the original print font of FIG. 17 by the reverse prediction function, thereby obtaining the print data.

When the compressive font stored in the ROM in the format of FIG. 19 is expanded to the normalization font in FIG. 18 by using the run length expander in FIG. 6, when a reduction ratio of the black bits by the prediction function is high, a length of continuous white bits becomes long, so that a portion in which white bits continue to appear over a plurality of words. When considering a portion from the black bit at a point A to the black bit at a point B in FIG. 18 as an example, 357 white bits continue. When they are divided on a word unit basis, 21 words become the words comprising only white bits, namely, white words (words of data $0000). In case of FIG. 18, the number of white words is equal to 103, which is almost similar to ¾ of the number (144) of all words.

In the run length expander in FIGS. 6A–6C, even in such a case where the white words continue, one word of the normalization font is formed while shifting one bit by one. Therefore, until one word is completed, the CPU doesn't detect that the word is a white word. In case of the normalization font in which many white words exist, consequently, it takes a long time for the run length expansion.

In the embodiment, since the white word counter to count the number of words (the number of white words) of the white bits from the number of white bits has been added in the run length expander in FIGS. 6A to 6C, a length of continuous white words can be read by the CPU. Therefore, in the case where the white word appears, the hardware of the run length expander reduces a waiting time of the CPU corresponding to the time which is required for bit shift. A processing speed of the run length expanding process of the normalization font in which the white words exist is raised. The throughput of the whole recording apparatus can be improved.

A block diagram of the run length expander according to the embodiment is almost similar to that shown in FIGS. 6A–6C except that only the white word counter differs. Therefore, a different point will now mainly be explained. The other constructions are similar to those in the embodiments 1 and 2.

Figure 20:
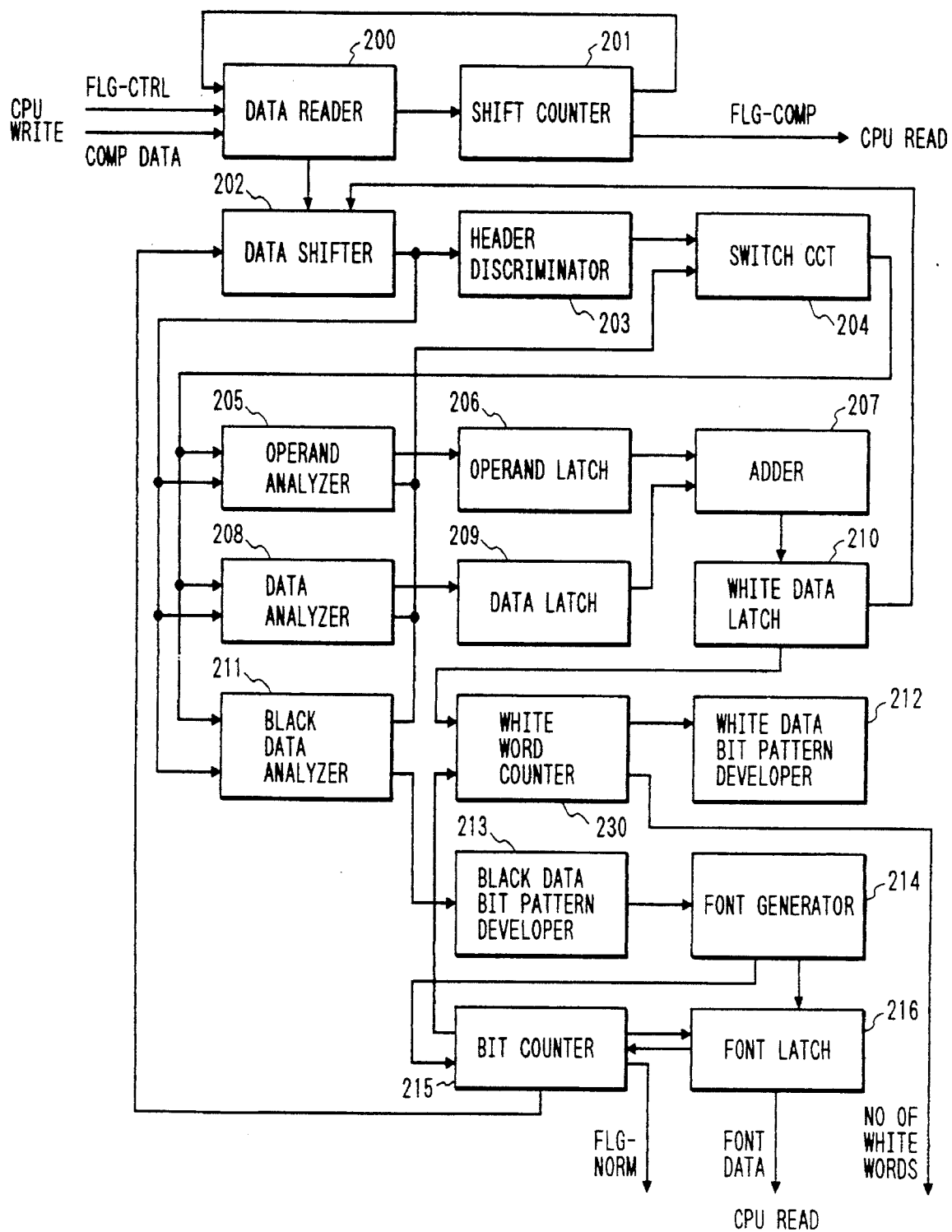
FIG. 20 is a block diagram showing a circuit construction of a run length expander according to an embodiment 4 of the present invention.

FIG. 20 shows a circuit construction of the run length expander according to the embodiment.

In FIG. 20, since a constructing portion shown by reference numerals 200 to 216 shows a functional block similar to that in FIGS. 6A–6C, its description is omitted here. In FIG. 20, however, in addition to a request (control flag) for the run length expansion which is written by the CPU, although not shown in FIGS. 6A–6C, the compressive data is shown and the normalization font one-word end flag FLG-NORM from the bit counter 215 and the compressive font one-word end flag FLG-COMP from the shift counter 201 are also shown as information which is read by the CPU. Reference numeral 230 denotes a white word counter as a functional block added in the embodiment. When the number of white bits which is derived from the white data latch circuit 210 is smaller than the number of remaining bits of one word during the formation in the bit counter 215, the white word counter 230 transfers the number of white bits to the white data bit pattern developer 212 as it is and generates "0" as the number of white words to be read by the CPU. When the number of white bits is equal to or larger than the number of remaining bits, the number of remaining bits is transferred to the white data bit pattern developer 212. The quotient (upper bits of bit 4 or more in the binary notation) which is obtained by dividing the number that is derived by subtracting the number of remaining bits from the number of white bits by 16 is generated as the number of white words to be read by the CPU. At the same time, the remainder is latched and held for one word to be produced next. The remainder is transferred to the white data bit pattern developer after the normalization font which is formed was read by the CPU.

The operation of the CPU in the embodiment will now be described.

After the run length expanding process was started by the control flag and the compressive font was written, the compressive font one-word end flag and the normalization font one-word completion flag are monitored. When the compressive font one-word end flag is set, the compressive fonts of one word are written. When the normalization font one-word completion flag is set, one word of the normalization fonts and the number of white words are read and the normalization fonts are transferred into the RAM. When the number of white words is equal to 0, the processing routine is returned to the monitor of the flag. When the number of white words is not equal to 0, the data $0000 (indicative of the words comprising only the white bits) of the number as many as only the number of white words is transferred to the RAM.

The points A and B in FIG. 18 will now be described as examples. When it is known that the number of white bits is equal to 357, the white word counter 230 compares the number (namely, 357) of white bits and the number (15 in this case) of remaining bits. Since the number of white bits is equal or larger than the number of remaining bits in this case, the number of bits (15) is transferred to the white data bit pattern developer 212, thereby completing one word of the normalization font during the formation. The quotient (357−15=342; 342/16=21 and the remainder is equal to 6) which is obtained by dividing the number that is obtained by subtracting the number of remaining bits from the number of white bits by 16 is subsequently set to the number of white words. The remainder "6" is latched and held for the next normalization font. The CPU detects that the normalization font one-word completion flag has been set, reads the normalization font, and transfers to the RAM. After that, the CPU reads the number of white words and transfers the data $0000 by the number of times corresponding to such a quotient value, namely, 21 times. Therefore, the CPU doesn't need to wait until the white word is formed 21 times. A processing speed of the run length expansion is improved. When the normalization font is read, the run length expander clears the normalization font one-word completion flag and simultaneously transfers the number (6) of white bits which has been latched for the next word of the normalization font to the white bit pattern developer. The processing routine advances to the formation of the next word.

In the embodiment, although the CPU accesses on a word (16 bits) unit basis, in case of accessing on a byte (8 bits) unit basis or a long word (32 bits) unit basis, by respectively setting the count values of the data reader 200 and latch circuit 216 and the shift counter 201 and bit counter 215 to 8 bits and 32 bits, the run length expander can be used.

In addition to the above embodiment, the invention can be also applied to the following examples.

1) In the embodiment 4, the CPU writes the compressive font into the run length expander and at a time point when the development of one word (16 bits) is finished, the normalization font one-word completion flag is detected and the produced normalization fonts are read out and stored in the RAM. On the other hand, by providing a DMA section for directly transferring the data to the RAM without transmitting through the CPU after completion of the development of one word, a data counter (for counting up to 144 words in case of 48×48 dots) of the data of one character, and a circuit for generating the data $0000 of the number as many as the number of white words, the judgment about the end of the development of one character can be also executed in the run length expander. Due to this, a processing speed can be further raised.

2) Further, a circuit for setting a start address of the RAM in which the compressive font storage start addresses in the ROM of the number corresponding to one line have been stored and a start address of the RAM in which the normalization fonts after completion of the run length expanding process of the number corresponding to one line have been stored from the CPU is added to the DMA section, so that all of the run length expanding processes of one line can be executed by the hardware. Since the load of the CPU is remarkably reduced, the throughput of the whole recording apparatus can be further improved.

3) Further, by adding a circuit for transferring the data to the reverse prediction processor and converting into the print font at a time point when the data of one column (3 words=48 bits in the embodiment 4) of the normalization fonts, all of the portions of the run length expansion and the conversion by the reverse prediction function in the operation sequence of the recording apparatus such as data reception, analysis of the character code, run length expansion, conversion by the reverse prediction function, and printing operation can be accomplished by the hardware. Therefore, the throughput of the whole recording apparatus is extremely raised.

4) Although the font size has been set to 48×48 dots in the embodiment 4, in the case where a plurality of font sizes exist, by newly providing a selector to thereby enable the count values of the shift counter 201 and bit counter 215 to be variable, the run length expander can be also used for different font sizes.

As described above, according to the embodiment 4, the processing speed of the run length expansion of the normalization fonts in the case where the words (white words) comprising only the white bits can be raised and the throughput of the whole recording apparatus can be improved.

According to the invention as described above, the processing speed of the data formation is raised and the throughput of the whole apparatus can be improved.

Although the embodiments have been described by using the recording apparatus, the image data can be also displayed on a display apparatus such as CRT, liquid crystal display apparatus, or the like.

The invention can be applied to a system which is constructed by a plurality of apparatuses or can be also applied to an apparatus comprising one apparatus. It will be obviously understood that the present invention can be also applied to the case where the invention is accomplished by supplying programs to a system or apparatus.

What is claimed is:

1. An output apparatus comprising:

memory means for storing image data obtained by changing a target pixel to a white pixel if a pattern comprising the target pixel and a pixel adjacent to the target pixel is coincident with a predetermined pattern and if the target pixel is a black pixel, such that image data is converted into image data having an increased number of white pixels and by compressing the converted image data by a run-length method;

expansion means for expanding the compressed image data read from said memory means by the run-length method; and reproduction means for reproducing image data on the basis of the image data expanded by said expansion means by changing a target pixel to a black pixel if a pattern comprising the target pixel and a pixel adjacent to the target pixel is not coincident with a predetermined pattern and if the target pixel is a white pixel, wherein said expansion means inputs the compressed image data in parallel, converts the input image data into serial data, expands the serial data, converts the expanded serial data into parallel data, and outputs resulting data in parallel, and wherein said reproduction means inputs the image data expanded by said expansion means in parallel, reproduces the image data on the basis of the input image data, and outputs the reproduced image data in parallel.

2. An apparatus according to claim 1, wherein said reproduction means reproduces the image data on the basis of the image data expanded by said expansion means by changing a target pixel to a black pixel if the pattern comprising the target pixel and a pixel adjacent to the target pixel is not coincident with the predetermined pattern and if the target pixel is a white pixel and by changing a target pixel to a white pixel if the pattern comprising the target pixel and a pixel adjacent to the target pixel is coincident with the predetermined pattern and if the target pixel is a black pixel.

3. An apparatus according to claim 1, wherein the image data stored in said memory means is obtained by changing a target pixel to a black pixel if the pattern comprising the target pixel and a pixel adjacent to the target pixel is not coincident with the predetermined pattern and if the target pixel is a white pixel, and by changing the target pixel to a white pixel, if the pattern is coincident with the predetermined pattern and if the target pixel is a black pixel, such that image data is converted into image data having an increased number of white pixels and by compressing the converted image data by the run-length method.

4. An apparatus according to claim 1, wherein the predetermined pattern comprises a pattern which appears as the target pixel with a high probability with respect to a combination of adjacent pixels.

5. An apparatus according to claim 1, further comprising output means for outputting the image data reproduced by said reproduction means.

6. An apparatus according to claim 5, wherein said output means comprises a printer or a display device.

7. An apparatus according to claim 1, further comprising DMA means for executing a DMA transfer of the image data when said expansion means expands the image data.

8. An apparatus according to claim 1, wherein said expansion means includes deriving means for deriving the number of words of white pixels on the basis of the number of white pixels and outputs data indicating that white pixels are included for the derived number of words.

9. An apparatus according to claim 1, wherein the image data comprises character font data.

10. An output method using a memory for storing image data obtained by changing a target pixel to a white pixel if a pattern comprising the target pixel and a pixel adjacent to the target pixel is coincident with a predetermined pattern and if the target pixel is a black pixel, such that image data is converted into image data having an increased number of white pixels and by compressing the converted image data by a run-length method, said output method comprising the steps of:

expanding the compressed image data read from the memory by the run-length method; and reproducing image data on the basis of the image data expanded in said expansion step by changing a target pixel to a black pixel if a pattern comprising the target pixel and a pixel adjacent to the target pixel is not coincident with a predetermined pattern and if the target pixel is a white pixel, wherein said expansion step inputs the compressed image data in parallel, converts the input image data into serial data, expands the serial data, converts the expanded serial data into parallel data, and outputs the resulting data in parallel, and wherein said reproduction step inputs the image data expanded in said expansion step in parallel, reproduces the image data on the basis of the input image data, and outputs the reproduced image data in parallel.

11. A method according to claim 10, wherein said reproduction step reproduces the image data on the basis of the image data expanded by said expansion means by changing a target pixel to a black pixel if the pattern comprising the target pixel and a pixel adjacent to the target pixel is not coincident with the predetermined pattern and if the target pixel is a white pixel and by changing a target pixel to a white pixel if the pattern comprising the target pixel and a pixel adjacent to the target pixel is coincident with the predetermined pattern and if the target pixel is a black pixel.

12. A method according to claim 10, wherein the image data stored in said memory means is obtained by changing a target pixel to a black pixel if the pattern comprising the target pixel and a pixel adjacent to the target pixel is not coincident with the predetermined pattern and if the target pixel is a white pixel, and by changing the target pixel to a white pixel, if the pattern is coincident with the predetermined pattern and if the target pixel is a black pixel, such that image data is converted into image data having an increased number of white pixels and by compressing the converted image data by the run-length method.

13. A method according to claim 10, wherein the predetermined pattern comprises a pattern which appears as the target pixel with a high probability with respect to a combination of adjacent pixels.

14. An method according to claim 10, further comprising the step of outputting the image data reproduced by said reproduction means.

15. A method according to claim 14, wherein said outputting is performed by a printer or a display device.

16. A method according to claim 10, further comprising the step of executing a DMA transfer of the image data when said expansion means expands the image data.

17. A method according to claim 10, wherein expansion step includes deriving the number of words of white pixels on the basis of the number of white pixels and outputting data indicating that white pixels are included for the derived number of words.

18. A method according to claim 10, wherein the image data comprises character font data.

* * * * *

UNITED STATES PATENT AND TRADEMARK OFFICE
CERTIFICATE OF CORRECTION

PATENT NO. : 5,586,225

DATED : December 17, 1996

INVENTORS : YASUKI ONIZUKA ET AL.

It is certified that error appears in the above-identified patent and that said Letters Patent is hereby corrected as shown below:

COLUMN 1

Line 17, "section" should read --section,--;
    Line 27, "mbytes." should read --Mbytes--;
    Line 45, "B size" should read --B4 size--;
    Line 46, "onto." should read --onto--;
    Line 49, "B size" should read --B4 size--;
    Line 61, "an" should read --a--.

COLUMN 2

Line 4, "throughout" should read --throughput--;
    Line 14, "throughout" should read --throughput--;
    Line 16, "A software" should read --Software--;
    Line 26, "executed" should read --executed on--;
    Line 33, "a" should be deleted.

COLUMN 5

Line 16, "A" should read --¶ A--.

UNITED STATES PATENT AND TRADEMARK OFFICE
CERTIFICATE OF CORRECTION

PATENT NO. : 5,586,225

DATED : December 17, 1996

INVENTORS : YASUKI ONIZUKA ET AL.

It is certified that error appears in the above-identified patent and that said Letters Patent is hereby corrected as shown below:

COLUMN 6

Line 66,   "exit," should read --exist,--.

COLUMN 7

Line 18,   "[Embodiment 2]" should read --¶ [Embodiment 2]--.

COLUMN 8

Line 6,   "sequence" should read --sequences--;
   Line 9,   "an" should be deleted.

COLUMN 10

Line 42,   "sequence" should read --sequences--.

UNITED STATES PATENT AND TRADEMARK OFFICE
CERTIFICATE OF CORRECTION

PATENT NO. : 5,586,225

DATED : December 17, 1996

INVENTORS : YASUKI ONIZUKA ET AL.

It is certified that error appears in the above-identified patent and that said Letters Patent is hereby corrected as shown below:

COLUMN 11

Line 28,   "ROM" should read --ROM--;
    Line 41,   "words" should read --words increases--.

COLUMN 16

Line 29,   "An" should read --A--;
    Line 37,   "expansion" should read --said expansion--.

Signed and Sealed this

Twenty-eighth Day of October, 1997

Attest:

BRUCE LEHMAN

*Attesting Officer*      *Commissioner of Patents and Trademarks*